(12) United States Patent
Basu et al.

(10) Patent No.: US 11,709,857 B2
(45) Date of Patent: Jul. 25, 2023

(54) APPARATUSES, METHODS, AND COMPUTER PROGRAM PRODUCTS FOR IMPROVED DATA FORMAT CONVERSION FOR SEMI-STRUCTURED DATA

(71) Applicant: Optum, Inc., Minnetonka, MN (US)

(72) Inventors: Indranil Basu, West Bengal (IN); Satishkumar Dontamsetty, Hyderabad (IN); Aravind Brahmadevara, Hyderabad (IN); Snigdha Sree Borra, Telangana (IN); Shubham Gupta, Bhopal (IN)

(73) Assignee: OPTUM, INC., Minnetonka, MN (US)

( * ) Notice: Subject to any disclaimer, the term of this patent is extended or adjusted under 35 U.S.C. 154(b) by 72 days.

(21) Appl. No.: 17/240,585

(22) Filed: Apr. 26, 2021

(65) Prior Publication Data

US 2022/0342900 A1  Oct. 27, 2022

(51) Int. Cl.
*G06F 17/00* (2019.01)
*G06F 16/25* (2019.01)
*G06N 5/04* (2023.01)
*G06N 20/00* (2019.01)

(52) U.S. Cl.
CPC .......... *G06F 16/258* (2019.01); *G06N 5/04* (2013.01); *G06N 20/00* (2019.01)

(58) Field of Classification Search
CPC ......... G06F 16/258; G06N 5/04; G06N 20/00
See application file for complete search history.

(56) References Cited

U.S. PATENT DOCUMENTS 5,909,570 A   6/1999  Webber
6,418,400 B1  7/2002  Webber
(Continued)

FOREIGN PATENT DOCUMENTS

WO   2020/089259 A1   5/2020

OTHER PUBLICATIONS

Gururangan, Suchin et al. "Don't Stop Pretraining: Adapt Language Models to Domains and Tasks," arXiv preprint arXiv:2004.10964v1 [cs.CL] Apr. 23, 2020, (19 pages).
(Continued)

*Primary Examiner* — Greta L Robinson
(74) *Attorney, Agent, or Firm* — Alston & Bird LLP

(57) ABSTRACT

Embodiments of the present disclosure provide for improved mapping from sequential semi-structured data of a first custom data format to a second custom data format. The improved mechanism for mapping between custom data formats significantly reducing the amount of manual effort otherwise used for creating mapping rules. Example embodiments utilize a state extractor model that extracts an untrained modified finite state machine embodied by a skeleton set of extracted states from particular sequential semi-structured input data, and generate a trained modified finite state machine that maps the first custom data format to the second custom data format based at least in part on the untrained modified finite state machine, sequential semi-structured input data of the first custom data format, and database structured output data of the second custom data format. The trained modified finite state machine may be used for subsequent processing data of the first custom data format.

20 Claims, 12 Drawing Sheets

(56) References Cited

U.S. PATENT DOCUMENTS

| | | | |
|---|---|---|---|
| 6,581,062 B1* | 6/2003 | Draper | G06F 16/258 |
| | | | 707/999.102 |
| 7,607,137 B2 | 10/2009 | Hauser et al. | |
| 8,769,480 B1 | 7/2014 | Wagner et al. | |
| 9,390,084 B2 | 7/2016 | Mitchell et al. | |
| 11,281,863 B2 | 3/2022 | Keskar et al. | |
| 2008/0168109 A1 | 7/2008 | Gaurav et al. | |
| 2012/0173475 A1 | 7/2012 | Ash et al. | |
| 2017/0228821 A1* | 8/2017 | Reimer | G06Q 10/0639 |
| 2018/0314956 A1* | 11/2018 | Biswas | G06N 20/00 |
| 2019/0163679 A1 | 5/2019 | Srinivasa et al. | |
| 2019/0377807 A1 | 12/2019 | Dean et al. | |
| 2020/0117737 A1 | 4/2020 | Gopalakrishnan et al. | |
| 2021/0319288 A1 | 10/2021 | Wagner et al. | |
| 2021/0350915 A1 | 11/2021 | Letinic | |
| 2022/0093088 A1 | 3/2022 | Rangarajan Sridhar et al. | |
| 2022/0107852 A1 | 4/2022 | Kulkarni et al. | |

OTHER PUBLICATIONS

Wang, Lidong. "Heterogeneous Data and Big Data Analytics," Automatic Control and Information Sciences, vol. 3, No. 1, pp. 8-15, Oct. 2017, DOI: 10.12691/acis-3-1-3.

Ainslie, Joshua et al. "ETC: Encoding Long and Structured Inputs in Transformers," arXiv preprint arXiv: 2004.084835v5 [cs.LG] Oct. 27, 2020, (17 pages). Available online: <URL: https://arxiv.org/pdf/2004.08483.pdf>.

Hu, Jiawei. "An Overview for Text Representations in NLP," Towards Data Science, Mar. 4, 2020, (21 pages), [Retrieved from the Internet Sep. 30, 2022] <URL: https://towardsdatascience.com/an-overview-for-text-representations-in-nlp-311253730af1>.

Michaeko. "X12 Reference Identification Qualifier EDI Blog," EDI Academy, Jul. 30, 2019, (46 pages), [Retrieved from the Internet Sep. 30, 2022] <URL: https://ediacademy.com/blog/x12-reference-identification-qualifier/>.

NonFinal Office Action for U.S. Appl. No. 17/240,585, dated Sep. 23, 2022, (12 pages), United States Patent and Trademark Office, US.

Shaw, Peter et al. "Self-Attention with Relative Position Representations," arXiv preprint arXiv:1803.02155v2 [cs.CL] Apr. 12, 2018, (5 pages), available online: <URL: https://arxiv.org/pdf/1803.02155.pdf>.

Wei, Junqiu et al. "NEZHA: Neural Contextualized Representation for Chinese Language Understanding," arXiv preprint arXiv:1909.00204v3 [cs.CL] Nov. 19, 2021, (9 pages), available online: <URL: https://arxiv.org/pdf/1909.00204.pdf>.

* cited by examiner

APPARATUSES, METHODS, AND COMPUTER PROGRAM PRODUCTS FOR IMPROVED DATA FORMAT CONVERSION FOR SEMI-STRUCTURED DATA

TECHNOLOGICAL FIELD

Embodiments of the present disclosure generally relate to transformation of sequential semi-structured data from a custom format, and specifically to improved mechanisms for data format conversion for sequential semi-structured data of a first custom data format to a second custom data format.

BACKGROUND

Various systems store data for any of a myriad of purposes. For example, a particular system often store data that is utilized for one or more processes performed by the system. Such systems may store data in any of a myriad of formats, and although standardized data formats exist, systems do not always strictly adhere to such standardized data formats. In certain circumstances, such data is also transmitted and/or otherwise transferred to another system, for example in the context of electronic data interchange (EDI) between systems associated with various business entities. In some circumstances, data format conversion of sequential semi-structured data is required to enable EDI to be performed accurately and effectively between two or more systems. Applicant has discovered problems with current implementations of data format conversion for sequential semi-structured data. Through applied effort, ingenuity, and innovation, Applicant has solved many of these identified problems by developing embodied in the present disclosure, which are described in detail below.

BRIEF SUMMARY

In general, embodiments of the present disclosure provide improved mechanisms for data format conversion of sequential semi-structured data, for example data format conversion of sequential semi-structured data from a first custom data format to a second custom data format. Other implementations for structured data format data format conversion will be, or will become, apparent to one with skill in the art upon examination of the following figures and detailed description. It is intended that all such additional implementations be included within this description be within the scope of the disclosure, and be protected by the following claims.

In accordance with at least one aspect of the present disclosure, a computer-implemented method is provided. The computer-implemented method may be executed by any of a myriad of computing devices embodied in hardware, software, firmware, and/or a combination thereof, as described herein. At least one example computer-implemented method includes receiving, by one or more processors, sequential semi-structured input data associated with a first custom data format. The example computer-implemented method further includes identifying, by the one or more processors, database structured output data corresponding to the sequential semi-structured input data, the database structured output data being associated with a second custom data format. The example computer-implemented method further includes generating, by the one or more processors and using a state extractor model, an untrained modified finite state machine associated with the first custom data format, the untrained modified finite state machine comprising a set of extracted states. The example computer-implemented method further includes training, by the one or more processors, a trained modified finite state machine that maps the first custom data format to the second custom data format via one or more mapping-based actions based at least in part on the sequential semi-structured input data, the untrained modified finite state machine associated with the first custom data format, and the database structured output data. The example computer-implemented method further include enabling, by the one or more processors, access to the trained modified finite state machine in order to perform the one or more mapping-based actions.

Additionally or alternatively, in some example embodiments of the computer-implemented method, the example computer-implemented method further includes modifying, via user input, the untrained modified finite state machine associated with the first custom data format by altering or deleting at least one state of the untrained modified finite state machine.

Additionally or alternatively, in some example embodiments of the computer-implemented method, the example computer-implemented method further includes configuring, via user input, the trained modified finite state machine by altering or deleting at least one state of the trained modified finite state machine.

Additionally or alternatively, in some example embodiments of the computer-implemented method, the example computer-implemented method further includes applying a second set of sequential semi-structured input data associated with the first custom data format to the trained modified finite state machine to generate a second set of database structured output data associated with the second custom data format.

Additionally or alternatively, in some example embodiments of the computer-implemented method, the trained modified finite state machine comprises a set of states and a set of state transitions, wherein at least one state of the set of states is associated with a first state transition to a first sub-state and a second state transition to a second sub-state, the first state transition is associated with a first mapping weight and the second state transition is associated with a second mapping weight, and the example computer-implemented method further includes determining, based at least in part on the first mapping weight and the second mapping weight, whether to utilize the first sub-state or the second sub-state.

Additionally or alternatively, in some example embodiments of the computer-implemented method, the state extractor model is configured for identifying, based at least in part on the first custom data format, a set of root states and a set of intermediary states.

Additionally or alternatively, in some example embodiments of the computer-implemented method, the trained modified finite state machine comprises at least one database addition action state, at least one database deletion action state, and at least one database update action state, and wherein mapping the first custom data format to the one or more mapping-based actions is performed based at least in part on the at least one database addition action state, the at least one database deletion action state, and the at least one database update action state.

Additionally or alternatively, in some example embodiments of the computer-implemented method, the first custom data format is associated with a first external data system that originated the sequential semi-structured input data.

Additionally or alternatively, in some example embodiments of the computer-implemented method, each extracted state of the untrained modified finite state machine is in a human-readable and editable data format.

Additionally or alternatively, in some example embodiments of the computer-implemented method, each state of the trained modified finite state machine is in a human-readable and editable data format.

Additionally or alternatively, in some example embodiments of the computer-implemented method, the trained modified finite state machine is associated with a finite non-empty set of symbols embodying an input alphabet; a finite non-empty set of states; an initial state from the finite non-empty set of states; a non-empty set of actions that can be taken after every state transition; a set of mapping weights assigned to various actions from the non-empty set of actions for a corresponding state from the finite non-empty set of states, wherein the mapping weight for a corresponding action from the non-empty set of actions is calculated based at least in part on a frequency of transition path occurrence from the corresponding state to the corresponding action; a state-transition transformation from a domain space characterized by the finite non-empty set of states and the finite non-empty set of symbols and a co-domain space characterized by the non-empty set of actions; and a set of final states that is a subset of the finite non-empty set of states.

In accordance with another aspect of the present disclosure, an apparatus is provided. At least one example apparatus includes at least one processor and at least one non-transitory memory having computer-coded instructions stored thereon. The at least one non-transitory memory, for example via execution with the apparatus, is configured to perform any one of the example computer-implemented methods as described herein. Another example apparatus includes means for performing each step of any one of the example computer-implemented methods as described herein.

In accordance with yet another aspect of the present disclosure, a computer program product is provided. At least one example computer program product includes at least one non-transitory computer-readable storage medium having computer program code stored thereon. The computer program code, in execution with at least one processor, is configured for performing any one of the example computer-implemented methods as described herein.

BRIEF DESCRIPTION OF THE DRAWINGS

Figure 1:
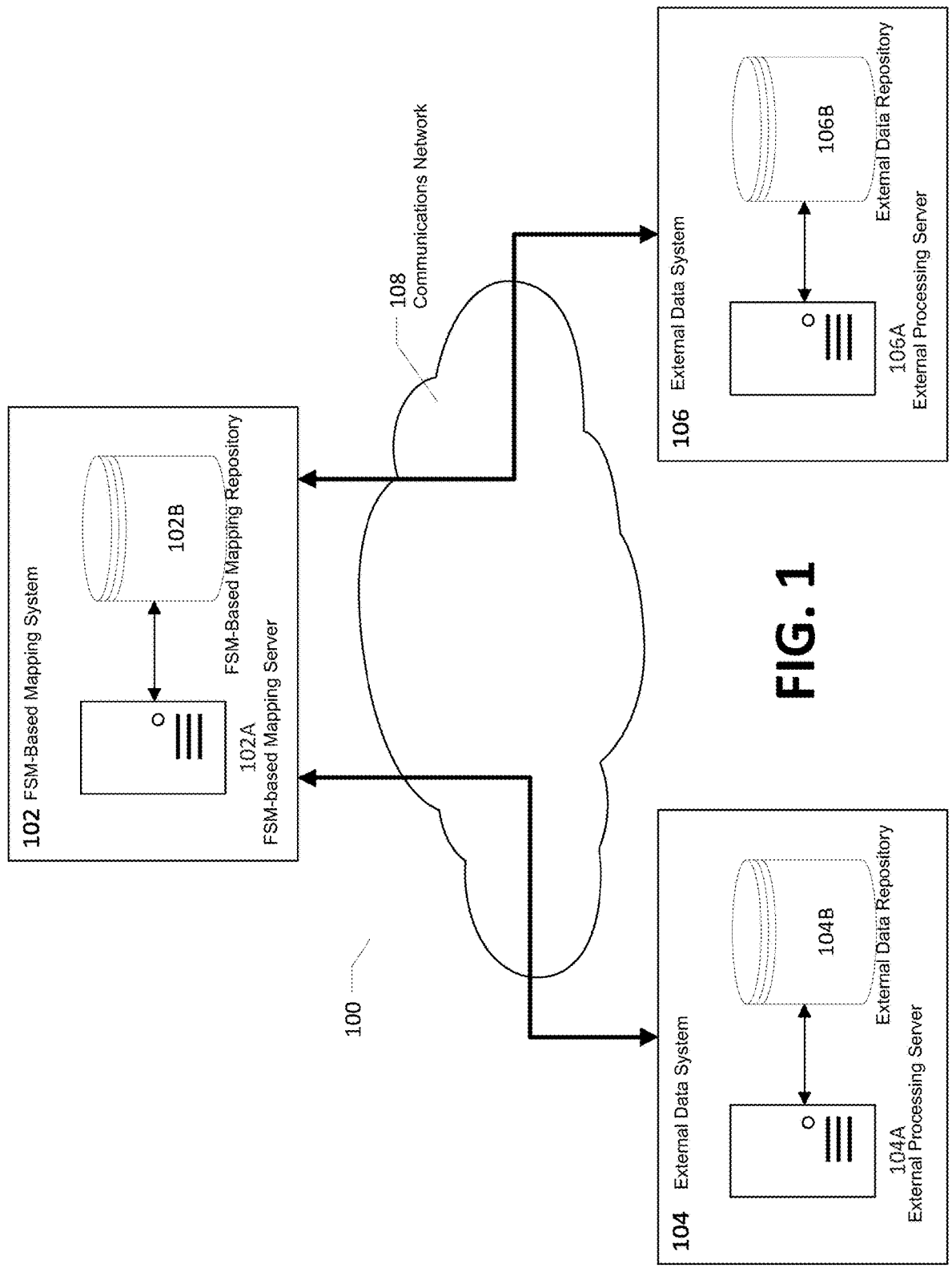
Figure 2:
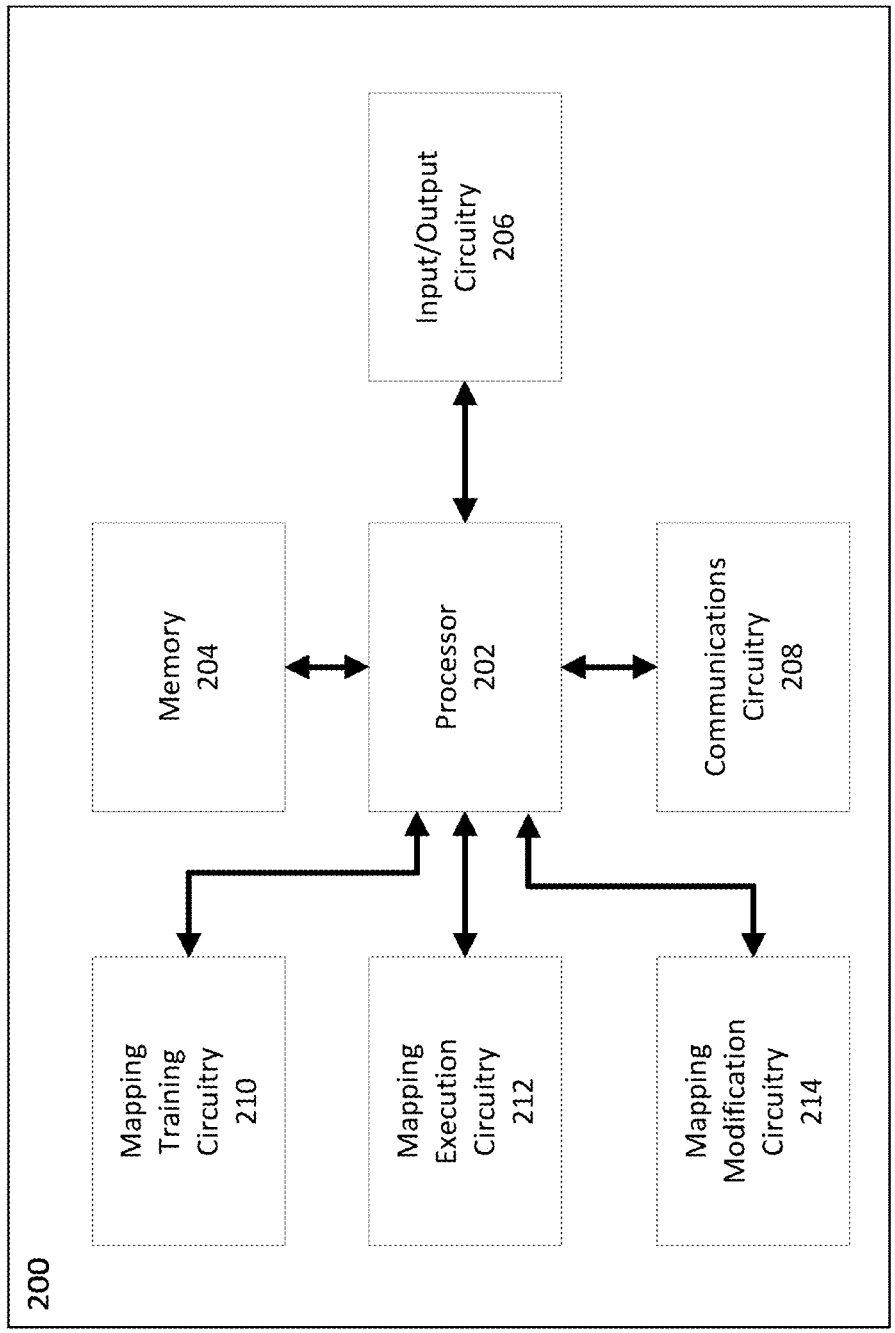
Figure 3:
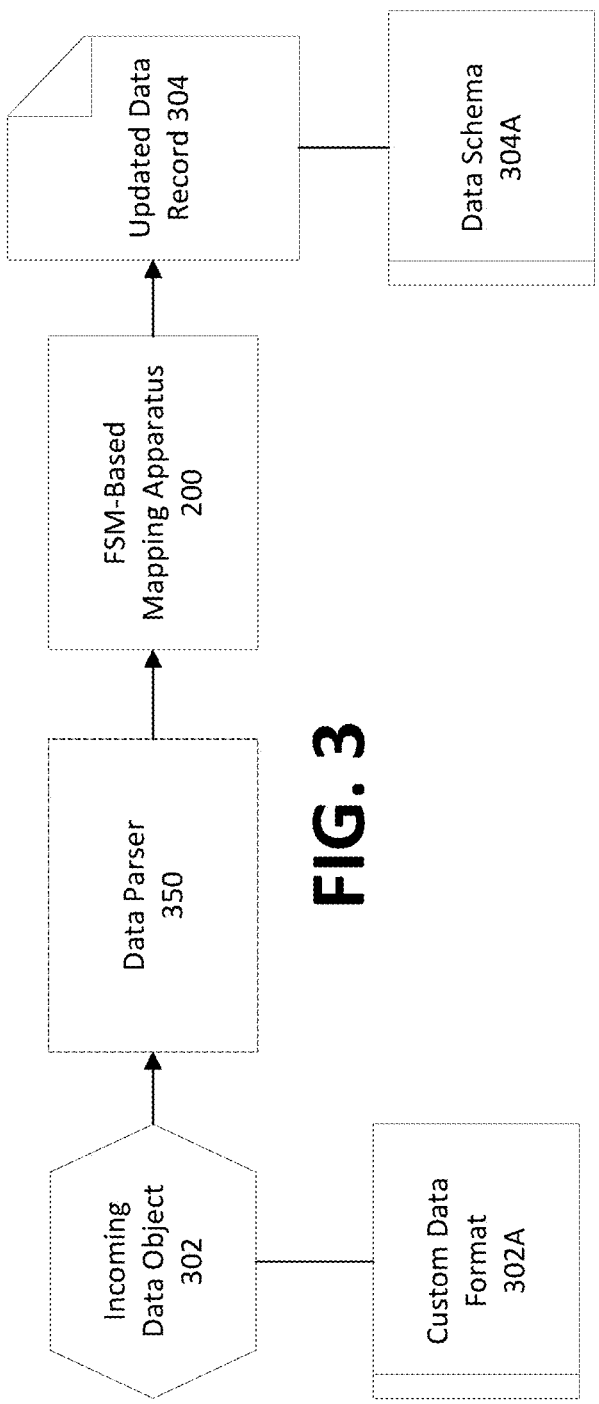
Figure 4:
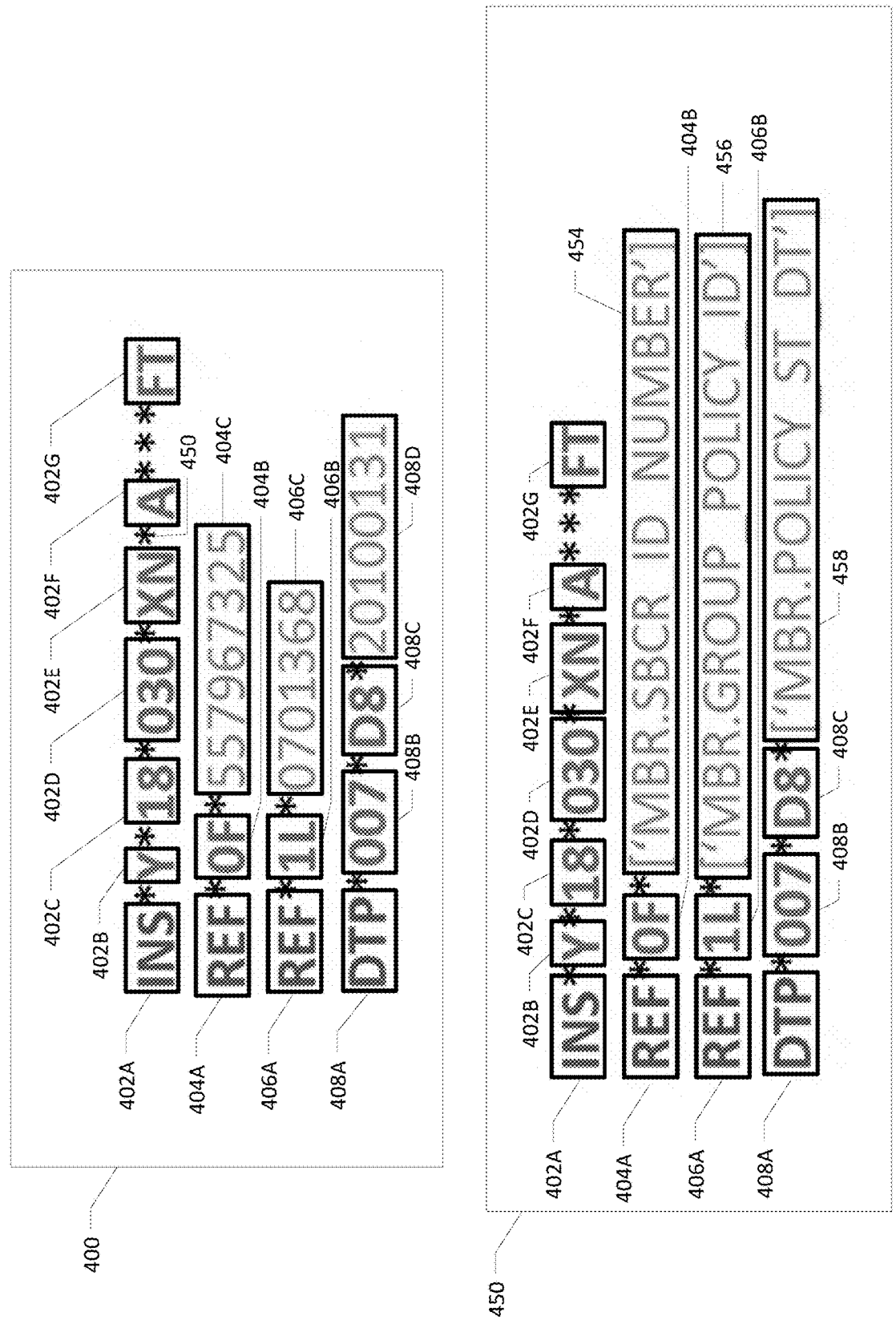
Figure 5:
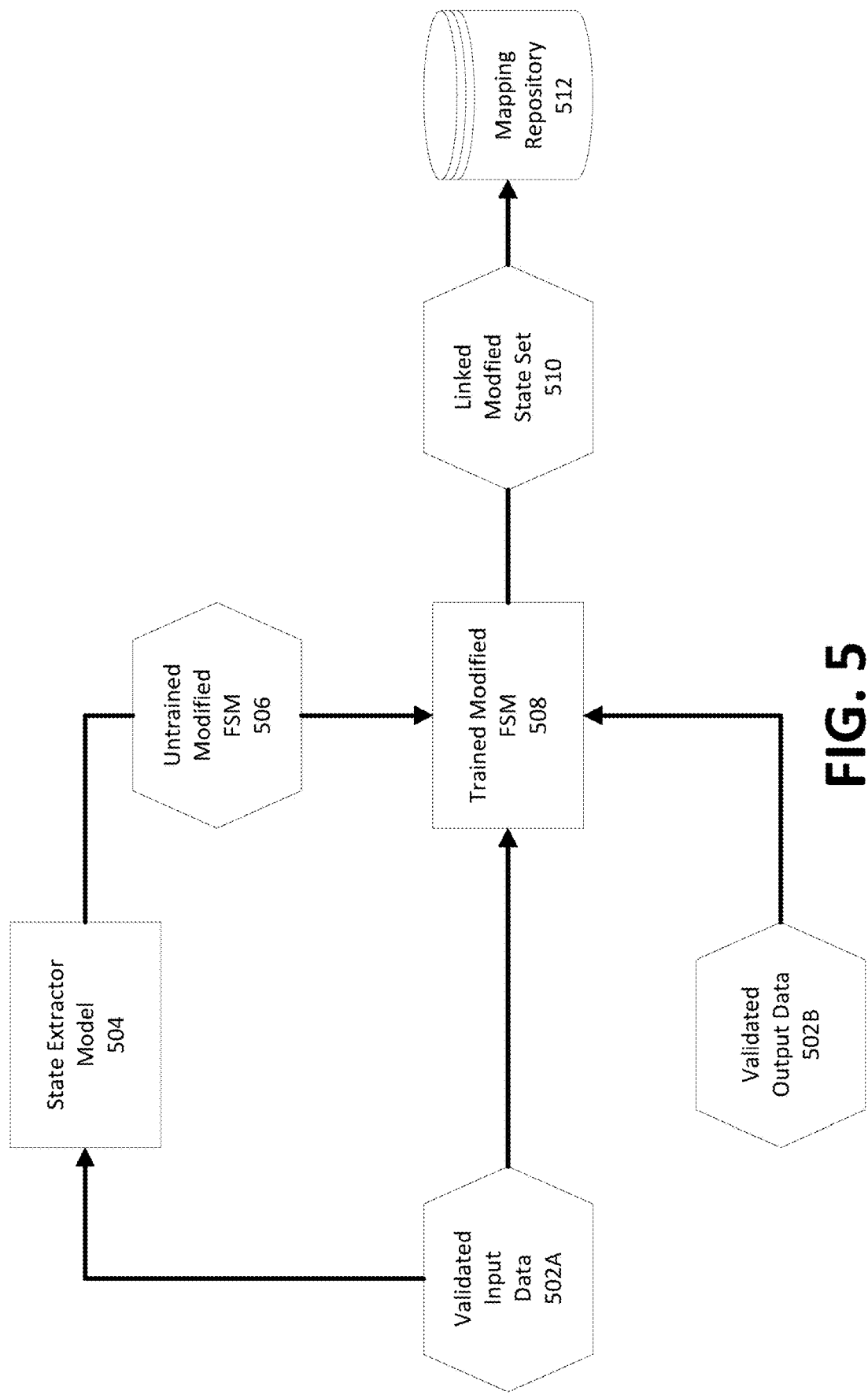
Figure 6:
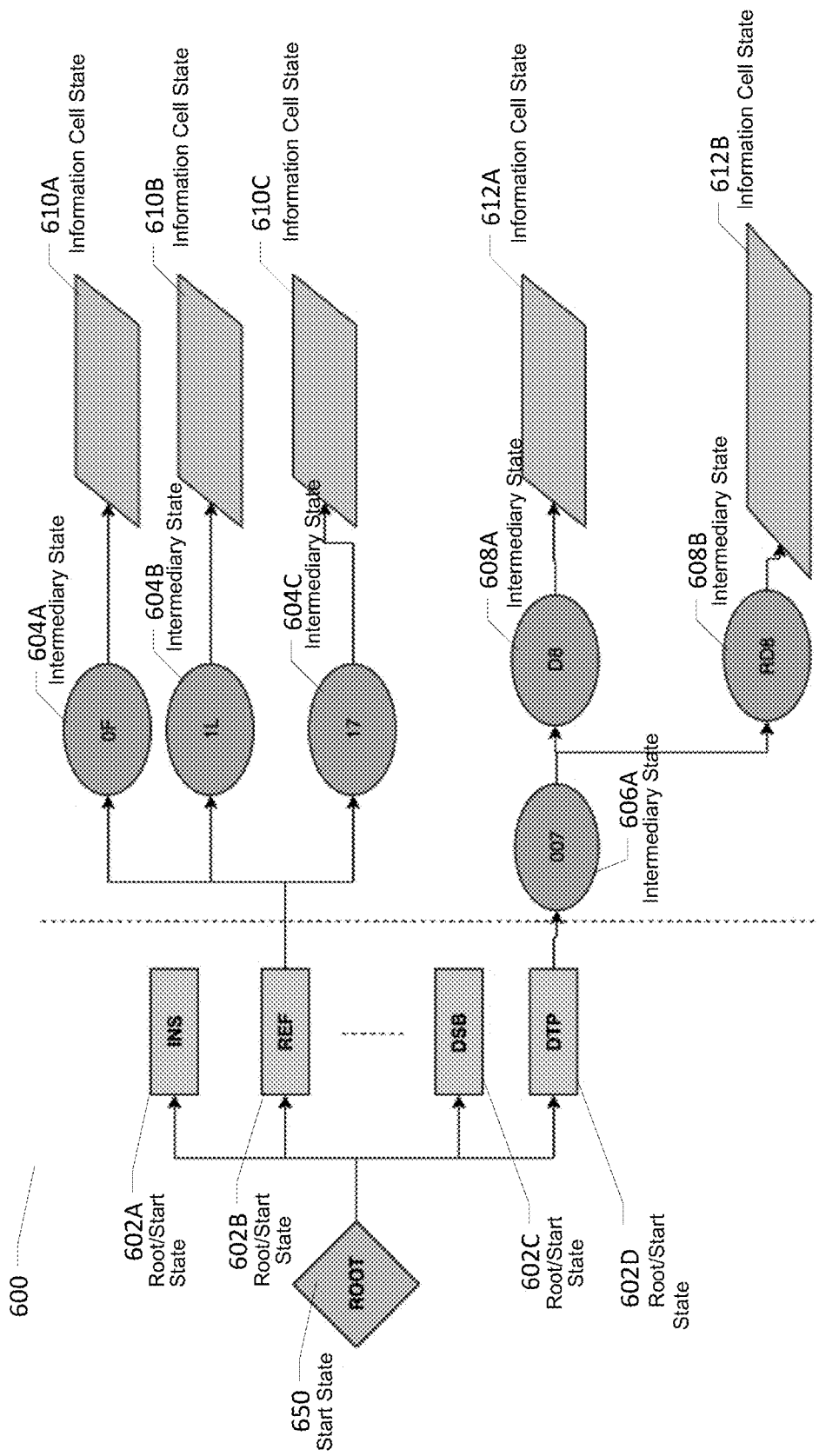
Figure 7:
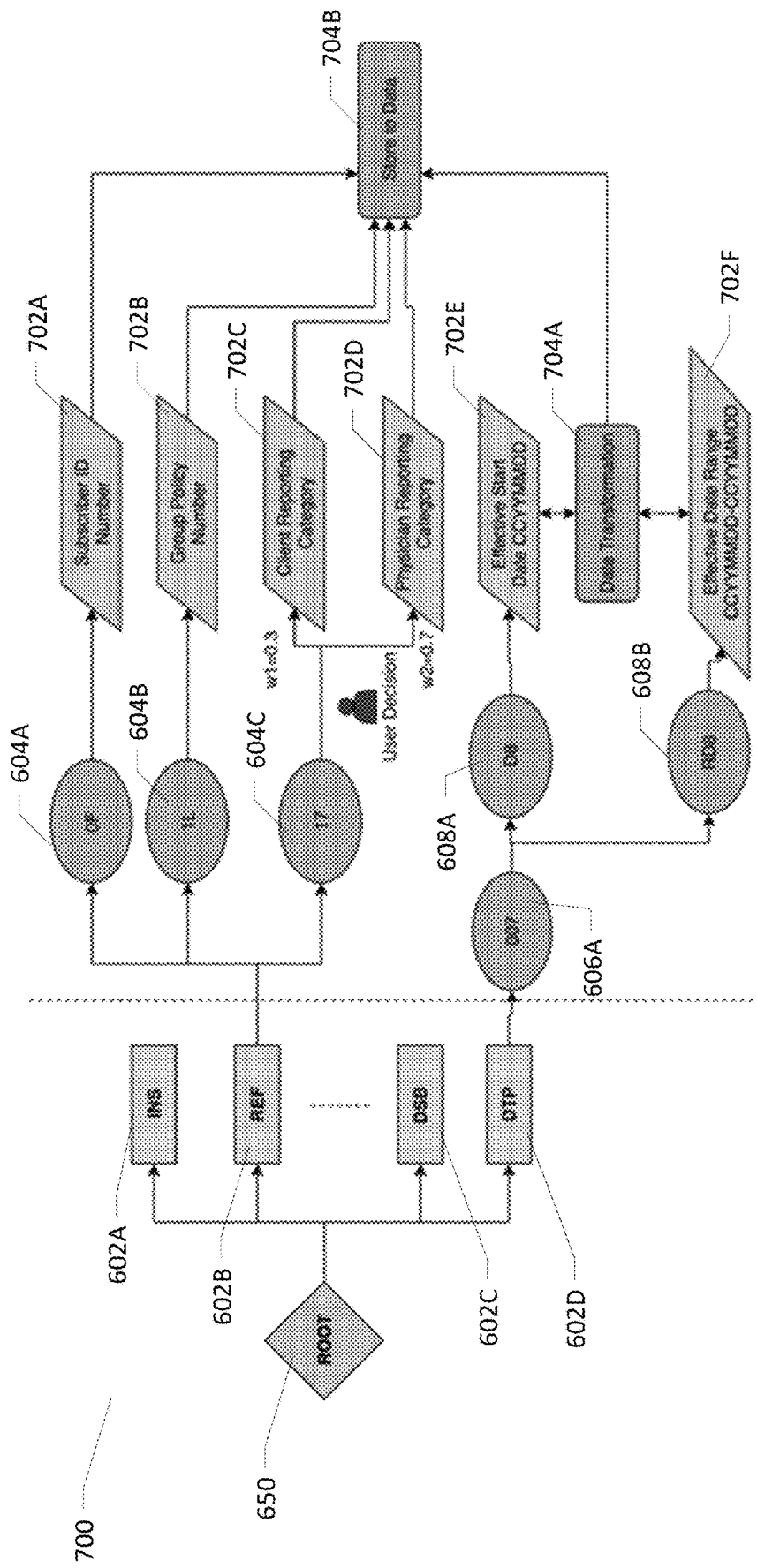
Figure 8:
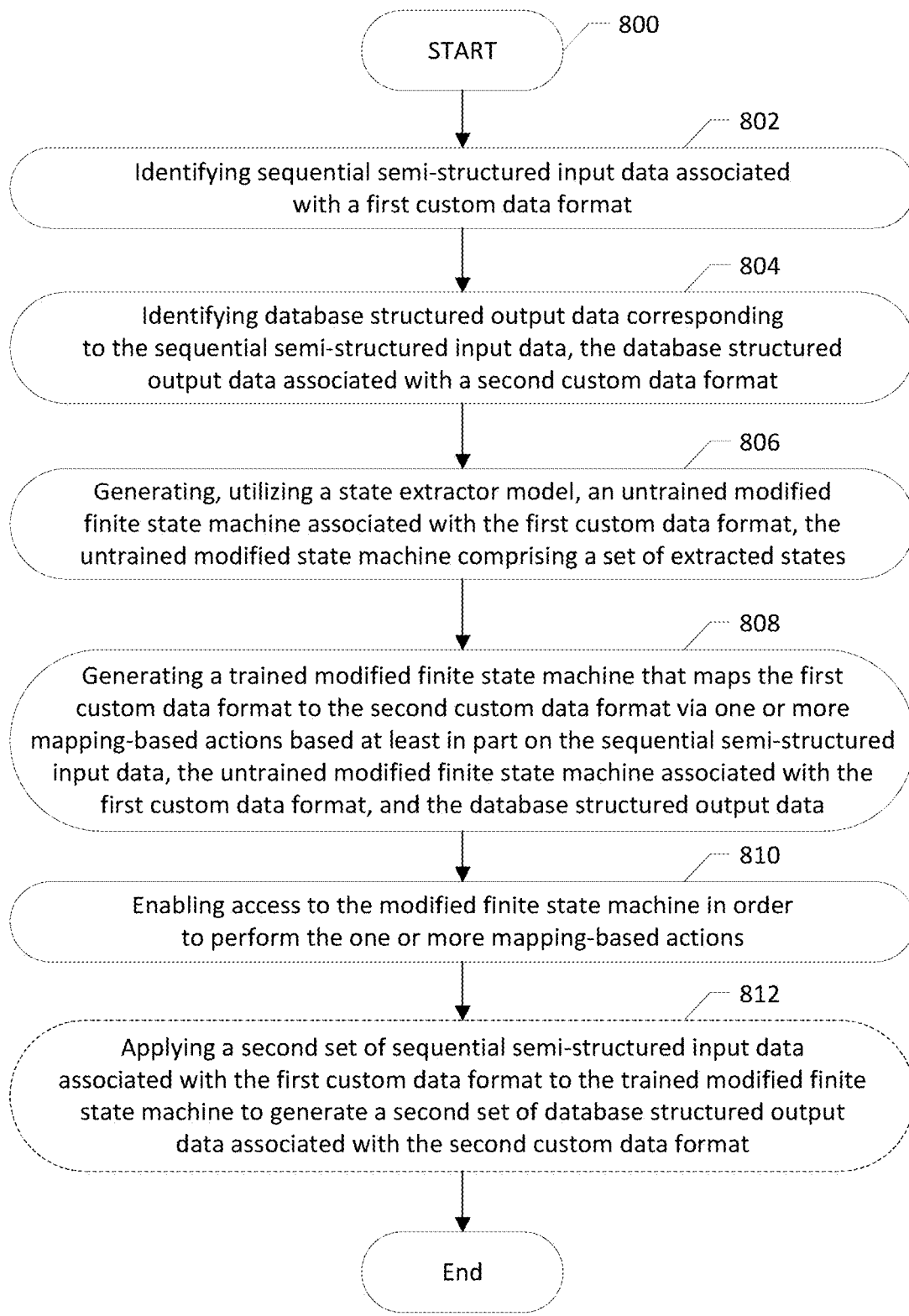
Figure 9A:
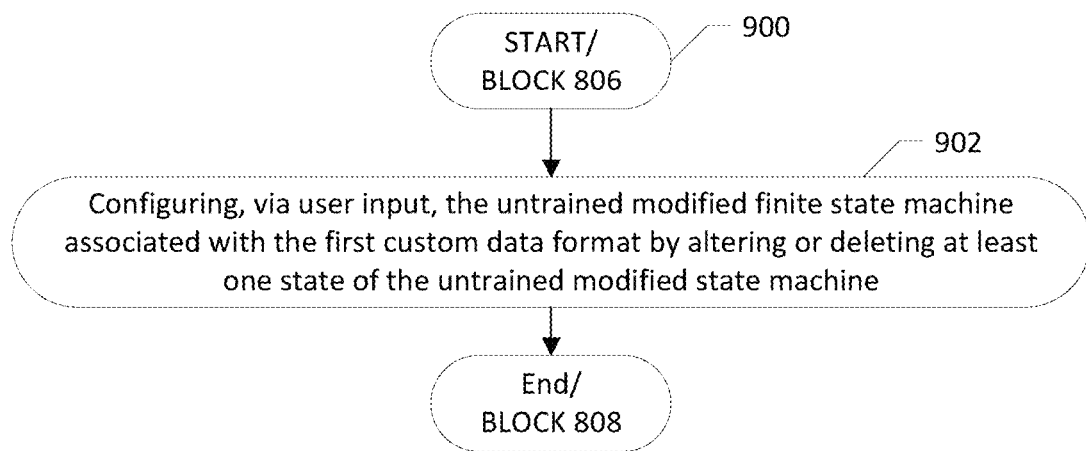
Figure 9B:
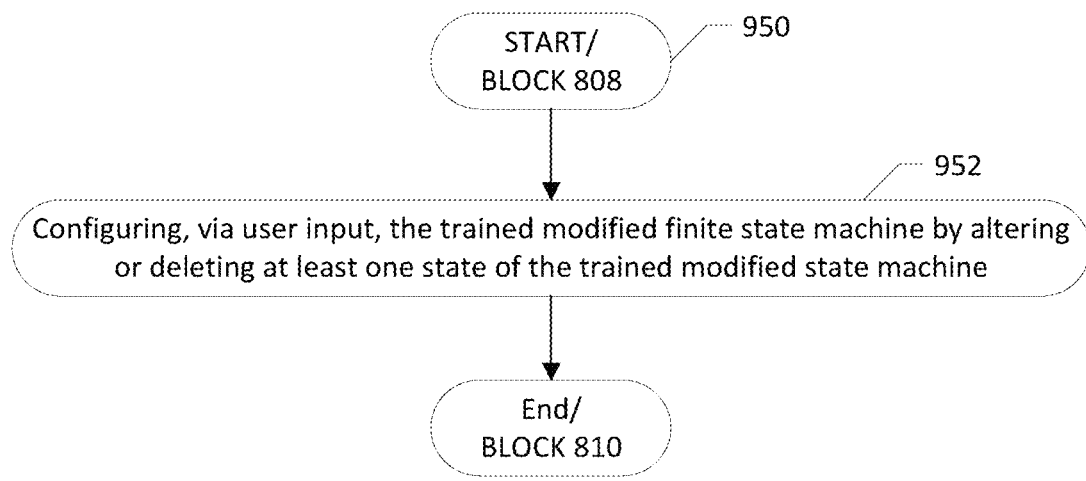
Figure 10:
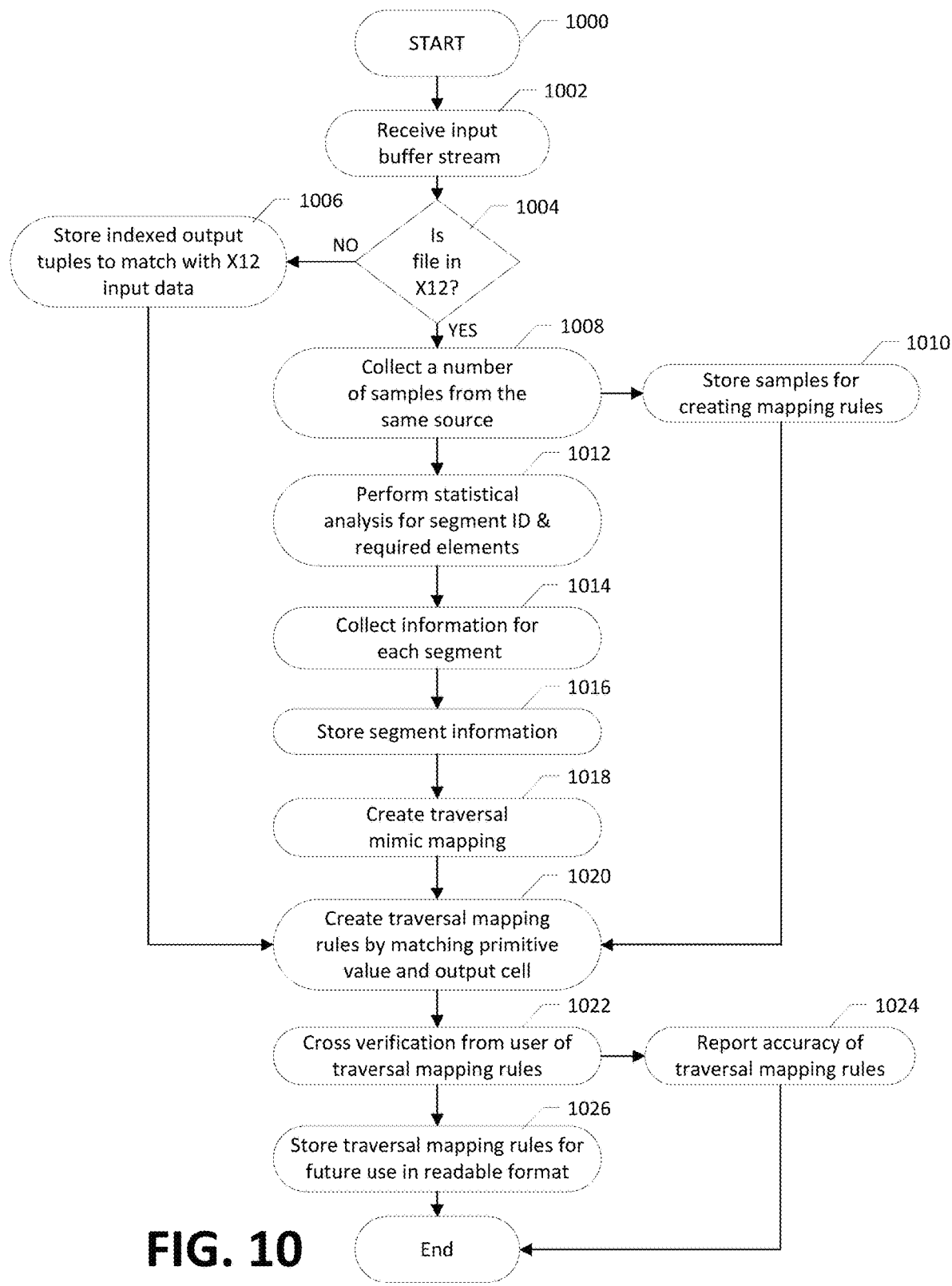
Figure 11A:
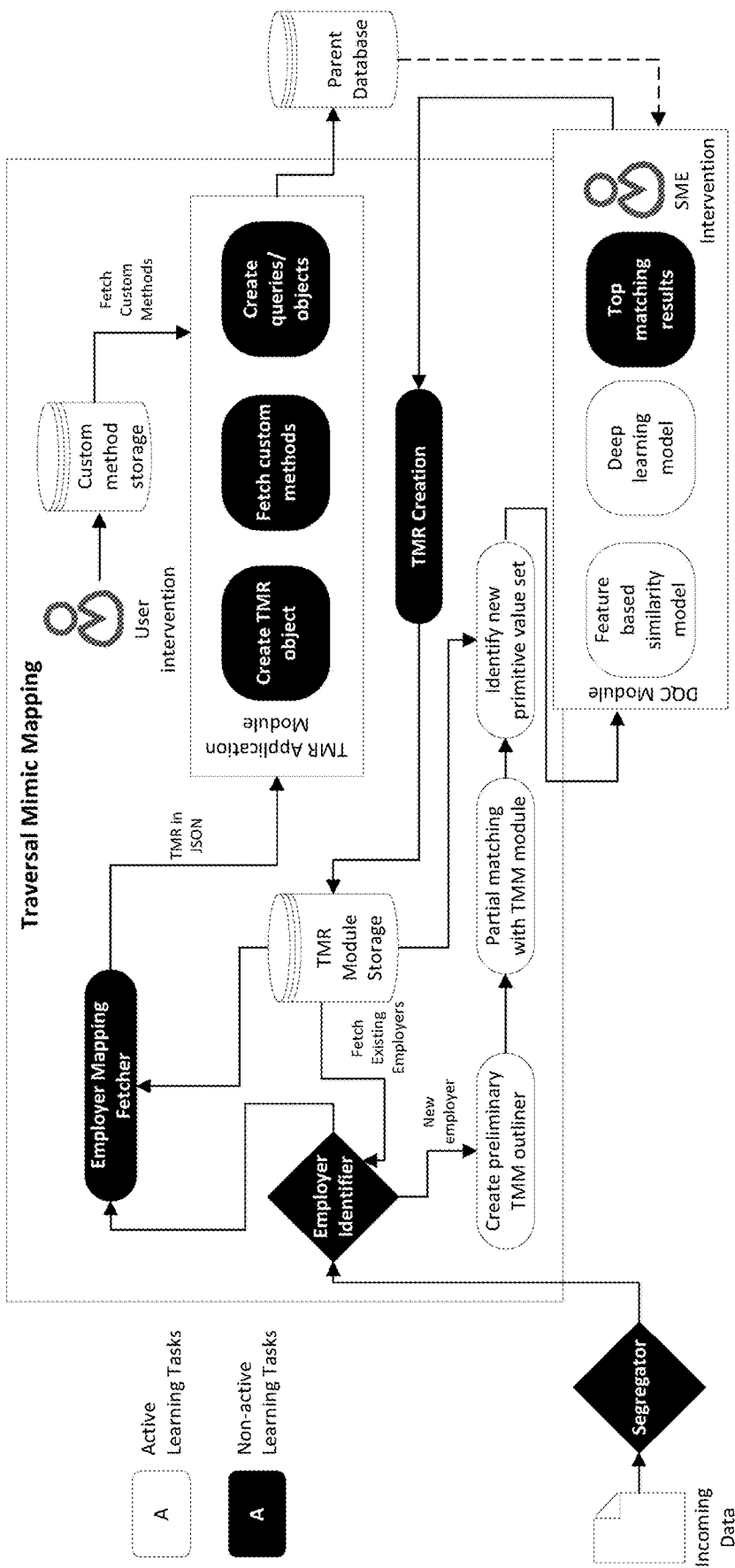
Figure 11B:
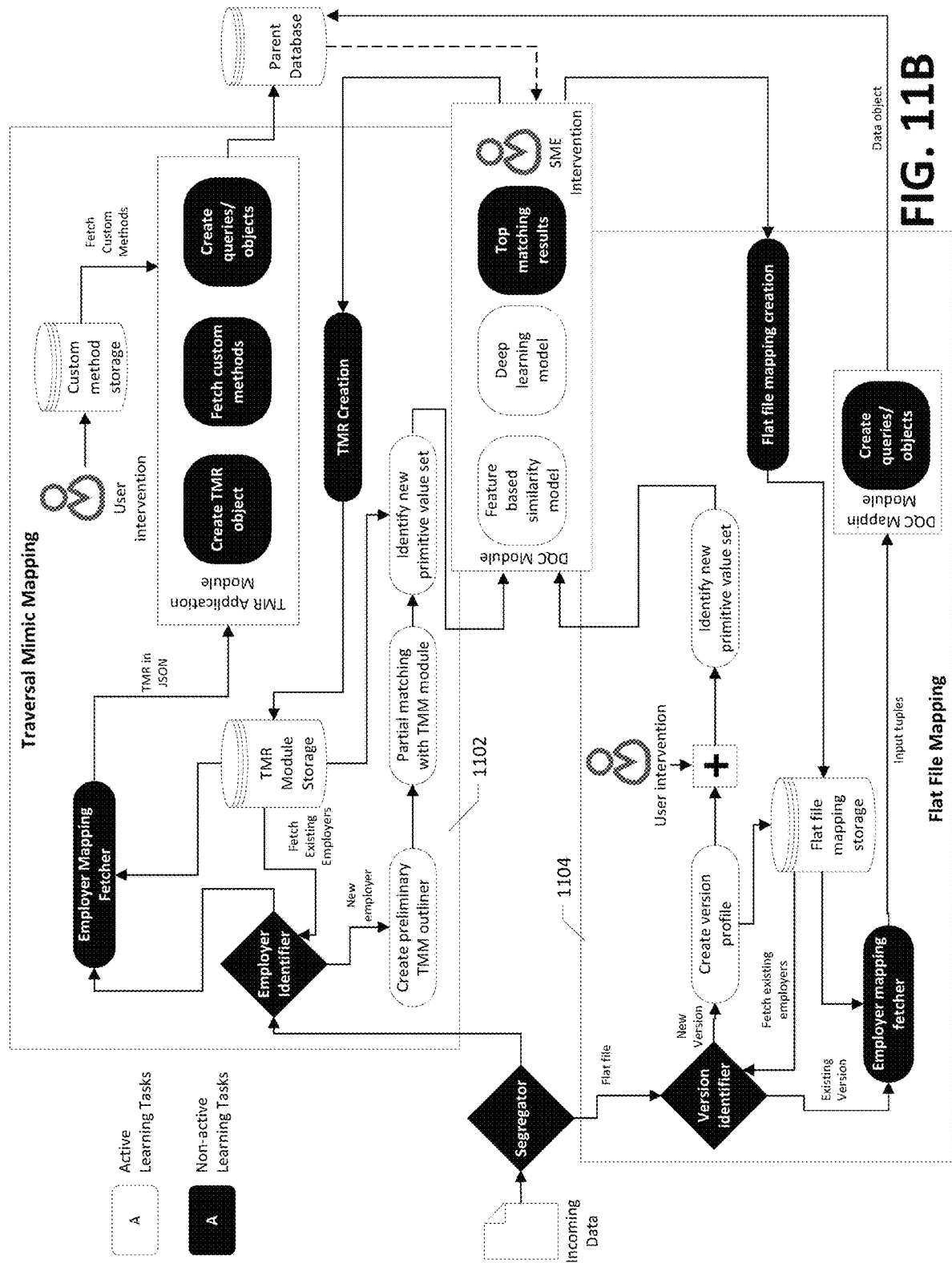

Having thus described the embodiments of the disclosure in general terms, reference now will be made to the accompanying drawings, which are not necessarily drawn to scale, and wherein:

FIG. 1 illustrates a block diagram of an example custom format mapping system that may be specially configured within which embodiments of the present disclosure may operate;

FIG. 2 illustrates a block diagram of an example custom format mapping apparatus that may be specially configured in accordance with an example embodiment of the present disclosure;

FIG. 3 illustrates a visualization of example data object mapping in accordance with at least some embodiments of the present disclosure;

FIG. 4 illustrates an example mapping from a first data format to a second data format in accordance with at least some embodiments of the present disclosure;

FIG. 5 illustrates a visualization of data interactions between components of an example computing environment in accordance with at least some embodiments of the present disclosure;

FIG. 6 illustrates a untrained modified finite state machine including a set of extracted states associated with mapping from a first custom data format in accordance with at least some example embodiments of the present disclosure;

FIG. 7 illustrates a trained modified finite state machine configured to map from a first custom data format to a second custom data format in accordance with at least some example embodiments of the present disclosure;

FIG. 8 illustrates a flowchart depicting operations of an example process for improved sequential semi-structured data format mapping in accordance with at least some example embodiments of the present disclosure;

FIG. 9A illustrates a flowchart depicting operations of another example process for improved structured data format mapping in accordance with at least some example embodiments of the present disclosure;

FIG. 9B illustrates a flowchart depicting operations of another example process for improved structured data format mapping in accordance with at least some example embodiments of the present disclosure;

FIG. 10 illustrates a flowchart depicting operations of a particular example process for improved structured data format mapping in accordance with at least some example embodiments of the present disclosure; and FIG. 11A illustrates a block diagram of an example computing architecture for improved structured data format mapping of X12-based files in accordance with at least some example embodiments of the present disclosure; and FIG. 11B illustrates a block diagram of another example computing architecture for improved structured data format mapping of multiple data format types in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview and Technical Advantages

Various embodiments of the present disclosure disclose techniques for data format conversion across data formats and across data formats and database actions that improve efficiency of performing database operations based on imported or otherwise received data. Absent utilizing the techniques discussed here, when processing imported data, a database system needs to perform computationally intensive format conversion operations in order to map the structure of the imported data to the structure of the data stored by the database system. This need in turn reduces the computational efficiency of the database system and potentially slows down the execution of other database management operations by the database system. Thus, by providing techniques for performing automated data format conversion using a trained finite state machine, various embodiments of the present invention improve the computational efficiency of database management systems and make important technical contributions to the field of database management.

Other exemplary technical advantages of various embodiments of the present invention are described below. Systems that transfer data between one another, for example EDI systems, often are capable of processing data in particular standardized formats. However, often times one or more entities configure corresponding EDI systems to utilize one or more custom data properties and/or values. In this regard, separate external data systems may each store different custom data properties, such that data records stored by such external data systems are each stored in different custom data formats.

Often times, such data is exchanged between systems as one or more of such systems rely on the external data records to perform one or more processes. Use of a standardized data format is meant to alleviate any problems, errors, and/or configuration difficulties in processing data records as such records are exchanged between various computing systems. However, deviations from a standardized data format reintroduces problems, errors, and/or other difficulties in processing the data records. In this regard, the custom data format for each external data system causes additional problems in processing data records by such systems, since a corresponding system may receive data records of the custom data format and be unable to properly process all portions of such data records, and/or incorrectly process one or more portions of such data records, leading to errors and/or data inaccuracies being introduced into the system that receives the data records of a custom data format.

In this regard, a particular system may intake and/or process a significant number of data records consistently and/or at regular intervals for any of a myriad of purposes. The significant number of data records may each come from distinct external data sources, many of which may utilize a custom data format for such data records rather than a standardized data format. In this regard, systems configured to process the standardized data format may be ineffective or fail entirely to accurately process data records of the custom data format, and/or may miss additional data that is provided but not captured by the scope of the standardized data format. In this manner, such data processing systems require mechanisms to enable accurate processing of such data records in each custom data format from each external data system while maintaining efficiency, such that a significant number of data records may be practically processed.

To enable integration with external data systems that utilize custom data formats, manual mappings associated with each custom data format may be created. For example, an engineer, technician, and/or user of a particular data processing system that receives incoming data records of a first custom data format may manually create mapping rules for mapping from the first custom data format to a second custom data format utilized by the data processing system. However, manually mapping from a particular custom data format is time consuming and requires human interaction to perform. Additionally or alternatively, such manual operations increase the likelihood that human error introduces one or more errors into the data mapping. Additionally or alternatively, once a mapping is established, should the first custom data format and/or second custom data format be changed, the data mapping must be manually re-mapped as well. The amount of manual effort required to achieve such mappings in a manual manner is further exacerbated as the number of custom data formats to be processed increases. In this regard, the inventors have identified that manual mapping from a first custom data format to a second custom data format is not optimal and, in many cases, not desirable due to the inefficiencies, cost, and risk of errors associated with such manual mappings.

One such example context in which such problems in exchange of data records arises is in the processing of healthcare data records associated with patient care. Data records indicating various aspects of patient care may be generated by and/or shared across systems for any of a number of healthcare service professionals and/or related entities, such as healthcare payment processors, healthcare insurance providers, and/or the like. In this example context, a data processing system for a healthcare insurance provider, for example, may rely on EDI for data integration between heterogeneous data records generated and/or otherwise provided by healthcare service professional systems (e.g., data systems for doctor's offices, hospitals, and/or the like) to process the most up-to-date data records representing care for various members and/or subscribers of the healthcare provider. The incoming data records received by the data processing system for the healthcare insurance provider from such healthcare service professional systems may embody information associated with any of a number of patient procedures performed, visitation notes, and/or the like, which may be relevant to the healthcare insurance provider for purposes of storing, processing for providing payment and/or other services, and/or the like.

In this example context, the healthcare insurance provider system serves as a central point that receives and processes data records from any number of external data systems (e.g., the healthcare service professional systems). In such circumstances, the healthcare insurance provider system may process each incoming data record to map such data records to corresponding data stored by the healthcare insurance provider's system in a custom data format utilized by the healthcare insurance provider system. While in an ideal context, each external data system would preferably be using a standardized data format (e.g., ASC X12, or an equivalent standardized data format), such an ideal context is not practical, and often one or more (or even all) of such external data systems utilizes a custom data format. The custom data format may differ from the standardized data format in any of a myriad of ways, for example by lacking one or more data values included in the standardized data format, including one or more additional data values not included in the standardized data format, utilizing one or more data values to represent different types of data from that of the standardized data format (e.g., a "name" field referring to a full name as opposed to just a first name), and/or the like. For the reasons identified by the inventors and described above, manually mapping each of custom data format associated with a particular external data system may be expensive, time-consuming, inaccurate, and/or otherwise undesirable.

Embodiments of the present disclosure provide for improved structured data format mapping utilizing a state extractor model and a trained modified finite state machine that maps a first custom data format to a second custom data format. In this regard, the state extractor model extracts a set of states associated with input data of a first custom data format. The set of extracted states may be learned based on statistical analysis of input data embodying any number of records in the first custom data format. Thus, embodiments learns what are most likely to be states of the first custom format as well as the state transitions between such extracted states by processing the input data of the first custom format. The generated set of extracted states embody an untrained modified finite state machine—or in other words a skeleton modified finite state machine—that includes such extracted states without particular states representing mappings between the first custom format (e.g., represented by input data) and the second custom format (e.g., represented by output data).

The untrained modified finite state machine subsequently may be trained based on the input data of the first custom data format and the output data of the second custom data format. In this regard, the trained modified finite state machine learns the mappings from the first custom data format to the second custom data format based on the "skeleton" set of extracted states embodied by the untrained modified finite state machine. Embodiments generate a trained modified finite state machine, based on this learning, that includes a finalized set of mapped states representing the mapping from the first custom data format to the second custom data format.

In some embodiments, the mappings from the first custom data format to the second custom data format represented by the trained modified finite state machine are configurable by a user. For example, in some embodiments, a user may provide a selection between one or more possible states in the trained modified finite state machine. Alternatively or additionally, the user may configure the trained modified finite state machine, for example to alter, remove, and/or add one or more mappings represented in the trained modified finite state machine.

The mappings represented by the trained modified finite state machine may be stored for further use. For example, in this regard, the trained modified finite state machine may be utilized in subsequent instances to map data records of the first custom data format to the second custom data format for use in subsequent processing. It should be appreciated that, in this regard, a trained modified finite state machine may be generated for each custom data format from which incoming data is received. Such embodiments may generate and/or otherwise maintain a set of trained modified finite state machines to enable mapping of the plurality of custom data formats. For example, a trained modified finite state machine may be generated and maintained for each of a plurality of external data systems with which a particular embodiment interacts.

Embodiments provide a number of technical advantages to the field of sequential semi-structured data format mapping. For example, embodiments generate mappings from sequential semi-structured data of a first custom data format to a second custom data format with significantly less required manual interaction(s) and/or all manual interactions eliminated. In this regard, embodiments of the present disclosure automate a significant portion of what is otherwise an entirely manual process. Such improvements may be provided not only for a single custom data format, but for any number of custom data formats, thus significantly increasing the overall effectiveness, efficiency, and accuracy of mapping processes performed by embodiments. Additionally or alternatively still, embodiments of the present disclosure may update such mappings automatically, at defined intervals, and/or the like, without requiring users to manually readjust said mappings. Additionally or alternatively still, embodiments of the present disclosure provide techniques for data type and pattern identification to refine output column mapping(s). Additionally or alternatively still, embodiments of the present disclosure enable value set identification to refine the mappings between custom data formats. One or more such embodiments improve value set identification by improving value sets identification by leveraging existing processing methodologies in addition to the methodologies described herein. Conventional implementations fail to provide any and all of the described advantages.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The terms "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

The term "example" is used herein to mean "serving as an example, instance, or illustration." Any implementation described herein as "example" is not necessarily to be construed as preferred or advantageous over other implementations.

The terms "computer-readable medium" and "memory" refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" refers to any computer embodied in hardware, software, firmware, and/or any combination thereof. Non-limiting examples of computing devices include a personal computer, a server, a laptop, a mobile device, a smartphone, a fixed terminal, a personal digital assistant ("PDA"), a kiosk, a custom-hardware device, a wearable device, a smart home device, an Internet-of-Things ("IoT") enabled device, and a network-linked computing device.

The term "external data system" may refer to one or more computing devices that are configured to generate, store, and/or otherwise originate sequential semi-structured input data in a particular custom data format. Non-limiting examples of an external data system includes a computing system and/or data repository associated with a particular trading partner in an electronic data interchange platform.

The term "FSM-based mapping system" may refer to any number of computing devices embodied in hardware, software, firmware, and/or a combination thereof, that maintains and/or trains a modified finite state machine for converting from a first custom data format to a second custom data format. A FSM-based mapping system may be associated with one or more external data systems, such that the FSM-based mapping system receives sequential semi-structured input data from and/or otherwise associated with each of the external data systems.

The term "sequential semi-structured input data" may refer to data organized in a manner such that a first portion of a data field of the data defines type parameters that are relevant to inferring a type of a second, subsequent portion of the data field. For example, in some embodiments, sequential semi-structured input data includes one or more delimiter(s) separating individual portions of the sequential semi-structured input data. Additionally or alternatively, in some embodiments, the sequential semi-structured input data includes multiple rows, with one or more rows associated with one another. Each data field may be utilized to infer a representation of the data value for the data field, infer one or more subsequent data fields, and/or infer the representations of data values for such subsequent data fields. For example, in an example sequential semi-structured input data, a first data field portion may define that the data field relates to an insurance provider identifier, as a result of which a system may infer that a second data field portion defines an insurance provider state.

The term "custom data format" may refer to a data format representing sequential semi-structured input data that includes one or more data properties that are not included in a corresponding standardized data format associated with a particular data standard. In example EDI contexts described herein, a custom data format differs from a standard X12 data format. An example of a custom data format is a custom data format defining each row including a plurality of sequential data properties/fields, and/or associated data values, for example where the sequential data properties provide context for the subsequent data properties and/or data value(s) in the row and/or another row. Another example of a custom data format is a custom data format defining one or more table columns to which particular data properties of a first custom data format are to be mapped for purposes of performing additions, deletions, and/or updates to the corresponding table columns.

The term "database structured output data" may refer to electronically managed data representing one or more data record(s) written to one or more database(s) based at least in part on corresponding sequential semi-structured input data. A single semi-structured sequential input data record may correspond to any number of database structured output data records in one or more database(s).

The term "extracted state" may refer to a data entity that describes a root state, intermediary state, and/or unmapped information cell state of a finite state machine that represents states for processing a sequential semi-structured input data of a custom data format. An extracted state is associated with a set of connections to any number of other extracted state(s). The term "set of extracted states" with respect to a particular custom data format refers to one or more data object(s) including any number of extracted state(s), where the set of extracted states represents one or more learned root state(s) and/or intermediary state(s), and state transition(s) between such state(s).

The term "state extractor model" may refer to electronically managed data that describes parameter, hyper-parameters, and/or defined parameters of a data processing model (e.g., a statistical model, an algorithmic model, and/or a machine learning model) that is configured to determine a set of extracted states representing a custom data format associated with a sequential semi-structured input data. In some embodiments, the state extractor model determines the set of extracted states based on the data field portions characterizing the sequential semi-structured input data. In some embodiments, a state extractor model is configured to identify one or more states based on generated impurity metric(s) for one or more portions of sequential semi-structured data. The impurity metric(s) may be utilized to differentiate between data values representing informational values (e.g., information cell states) and other data values such as contextual data values (e.g., intermediate states). Non-limiting examples of an impurity metric generated by a state extractor model include an entropy metric and a Gini impurity metric.

The term "modified finite state machine" may refer to electronically managed data that describes parameter, hyper-parameters, and/or defined parameters of a data processing model characterized by a set of state transitions between a set of states, where the data processing model is configured to map data entities in a first custom format to corresponding data entities in a second custom format. In some embodiments, a trained modified finite state machine is embodied such that each state and/or transitions between states are learned based on mapping weights between such states. For example, in some embodiments, the trained modified finite state machine by the septuple ($\Sigma$, S, $s_0$, $\delta$, F, A, $\omega_S$). In said septuple, $\Sigma$ is a finite non-empty set of symbols embodying an input alphabet. Additionally, S is a finite non-empty set of states, for example embodied by the extracted states representing the untrained modified finite state machine. Additionally, $s_0$ is an initial state from the non-empty set of states S, for example an initial state of the set of states representing the untrained modified finite state machine. A is a non-empty set of actions that can be taken after every state transition, for example representing data transformation, data interpretation, insertion into database tables, and/or the like. $\omega_S$ is a set of mapping weights assigned to various actions for a specific state from S, wherein the mapping weight for an action is calculated based on at least a frequency of transition path occurrence for a path from the specific state to a corresponding action. In this regard, the statistical prevalence of a particular occurrence of a state transition to another state in the validated input data represents the mapping weight for said state transition. $\delta$ is a state-transition function embodied by $\delta$: $S \times \Sigma \rightarrow S$, $A(\omega_S)$. F is a set of final states embodying a subset of S. It should be appreciated that the set of final states may embody an empty subset. Non-limiting examples of the set of final states include table columns, inferences in a Bayesian context, and/or the like.

The term "mapping weight" may refer to electronically managed data representing an inferred probability (e.g., a probability inferred based on one or more statistical processing operations) associated with a state transition from a first state to a second state in a trained modified finite state machine. The term "set of mapping weights" refers to one or more data object(s) including any number of mapping weights.

The term "root state" may refer to electronically managed data describing a start state of a finite state machine learned from the start of input information used to train the finite state machine. In some embodiments, the root state is determined based on the initial data field portions of sequential semi-structured input data. It should be appreciated that The term "set of root states" refers to one or more data object(s) including any number of root states.

The term "intermediary state" refers to a state of a finite state machine that is connected via a state transition to a root state or to another intermediary state, and that is not an information cell state or an action state. In some embodiments, the intermediary states are determined based on intermediate field portions of sequential semi-structured input data. The term "set of intermediary states" refers to one or more data object(s) including any number of root states.

The term "information cell state" may refer to electronically managed data describing a state of a finite state machine that represents a database column or other data property of a second custom data format corresponding to sequential semi-structured input data from a first custom data format. In some embodiments, the information cell is determined based on final field portions of sequential semi-structured input data. The term "set of information cell states" refers to one or more data object(s) including any number of information cell states.

The term "database addition action state" may refer to electronically managed data describing a particular state of a modified finite state machine that corresponds to the action of modifying data for storing of one or more new database structured output data record(s). In some embodiments, upon reaching a database addition action state, an FSM-based mapping system initiates one or more process(es) for performing the storing of the one or more new database structured output data record(s) represented by the database addition action state.

The term "database deletion action state" may refer to electronically managed data describing a particular state of a modified finite state machine that corresponds to the action of deletion of one or more database structured output data record(s). In some embodiments, upon reaching a database deletion action state, an FSM-based mapping system initiates one or more process(es) for performing the deletion of the one or more database structured output data record(s) represented by the database deletion action state.

The term "database update action state" may refer to electronically managed data describing a particular state of a modified finite state machine that corresponds to the action of updating one or more database structured output data record(s). In some embodiments, upon reaching a database update action state, an FSM-based mapping system initiates one or more process(es) for performing the update of the one or more database structured output data record(s) represented by the database update action state.

The term "human-readable and editable data format" may refer to electronically managed data describing a data format for a data object, file, or other electronically-managed data that includes each data property with a corresponding data value utilizing structured text such that each pair of data property and data value is deemed identifiable by a human user and such that the data value for a particular property can be updated by the human user. A non-limiting example of a human-readable and editable data format includes JavaScript Object Notation (JSON).

Example Systems of the Disclosure

FIG. 1 illustrates a block diagram of an example custom format mapping system that may be specially configured within which embodiments of the present disclosure may operate. Specifically, FIG. 1 depicts an example custom format mapping system 100. The example custom format mapping system 100 includes an FSM-based mapping system 102, a first external data system 104, and a second external data system 106. The FSM-based mapping system 102 may communicate with one or more of the first external data system 104 and the second external data system 106 over one or more communication networks, such as the communications network 108.

In some example contexts, each of the external data systems 104 and 106 includes one or more computing devices that generates, collects, and/or processes data records in a particular custom data format. For example, in some embodiments, the external data system 104 is configured to enable storing and/or processing of data associated with a first entity (e.g., in one example context, services provided by a first healthcare service professional). In this regard, the external data system 104 may perform various functionalities associated with the data generated, collected, and/or otherwise obtained by the external data system 104. Additionally or alternatively, in some embodiments, the external data system 106 is configured to enable storing and/or processing of data associated with a second entity (e.g., in one example context, services provided by a second healthcare service professional). In this regard, the external data system 106 may perform various functionalities associated with the data generated, collected, and/or otherwise obtained by the external data system 106.

As illustrated, the external data system 104 includes an external processing server 104A and an external data repository 104B. The external processing server 104A may be embodied in hardware, software, firmware, and/or a combination thereof, to perform various processing functionality. It should be appreciated that the particular functionality performed by the external processing server 104A may be any computing functionality that generates, collects, aggregates, and/or otherwise makes available data associated with such functionality. For example, in one example context, the external processing server 104A is configured to enable receipt of user input and/or automatic collection of data embodying services performed by a healthcare service professional for one or more patients.

In some embodiments, the external processing server 104A includes any number of server devices. For example, in some embodiments, the external processing server 104A includes one or more locally connected servers. Additionally or alternatively, in some embodiments, the external processing server 104A includes any number of remote and/or "cloud" servers configured to communicate with one another over a network. In some embodiments, some or all of the computing devices embodying the external processing server 104A are remotely located from one another.

The external data repository 104B may be embodied in hardware, software, firmware, and/or a combination thereof, to perform various data storage functionality. The external data repository 104B may embody any number of databases, tables, data objects, relationships between data objects, and/or the like. In some embodiments, the external data repository 104B is communicable with the external processing server 104A to enable the external processing server 104A to store data to the external data repository 104B and/or retrieve data from the external data repository 104B for processing. The external data repository 104B may be embodied by one or more memory devices, processing circuitry, and/or the like.

In some embodiments, the external data repository 104B includes any number of sub-repositories. For example, in some embodiments, the external data repository 104B includes one or more locally connected sub-repositories. Additionally or alternatively, in some embodiments, the external data repository 104B includes any number of remote and/or "cloud" repositories configured to communicate with one another over a network. In some embodiments, some or all of the computing devices embodying the external data repository 104B are remotely located from one another.

The external data system 104 may process and/or store data in a particular first custom data format. For example, in some embodiments, the external data repository 104B is configured to store data records in one or more data tables, each having a particular column format. In this regard, a particular data record may be embodied by data portions from one or more of such data tables. In some such embodiments, the external processing server 104A processes input data for storing to the external data repository 104B for future processing and/or use. Such data stored by the external data system 104 may be transmitted to one or more external systems, for example the FSM-based mapping system 102, for further processing as described herein.

As illustrated, the external data system 106 includes an external processing server 106A and an external data repository 106B. The external processing server 106A and the external data repository 106B are configured similarly to that of the similarly-named components described with respect to external data system 104. For example, the external data system 106 may collect, generate, obtain, and/or process data associated with a second entity. For example, continuing the example context described, the external data system 106 may, utilizing the external processing server 106A and/or external data repository 106B, enable user input and/or automatic collection of data embodying services performed by a second healthcare service professional for one or more patients (e.g., the same patients and/or other patients to those of the first healthcare service professional).

The external data system 106 may process and/or store data in a second particular custom data format. For example, in some embodiments, the external data repository 106B is configured to store data records in one or more data tables, each having a particular column format. In this regard, a particular data record may be embodied by data portions from one or more of such data tables. In some such embodiments, the external processing server 106A processes input data for storing to the external data repository 106B for future processing and/or use. Such data stored by the external data system 106 may be transmitted to one or more external systems, for example the FSM-based mapping system 102, for further processing as described. In this regard, it should be appreciated that, to enable processing of data from both the external data system 104 and the external data system 106, the FSM-based mapping system 102 may be configured to map both the first custom data format and the second custom data formats utilizing improved sequential semi-structured data format mapping, as described herein.

The FSM-based mapping system 102 includes any number of computing devices embodied in hardware, software, firmware, and/or the like, configured to receive and/or otherwise ingest data records from one or more external data systems for processing. For example, in some embodiments, the FSM-based mapping system 102 ingests data records for the purposes of storing the data records, processing the data records to provide particular functionality, and/or the like. In one example context, the FSM-based mapping system 102 embodies a healthcare insurance provider system that intakes data records from various systems associated with healthcare service professionals. Such a healthcare insurance provider system may intake hundreds, thousands, or more of data records representing information about patients, patient care, services performed, enrollment and disenrollment, and/or the like.

The FSM-based mapping system 102 may store and/or process data in a particular custom format. In this regard, the FSM-based mapping system 102 is configured to map incoming data records of any other custom data format to the custom format utilized by the FSM-based mapping system 102. Such mapping is performed in a manner that reduces the reliance on manual interaction by one or more users, for example by utilizing a state extractor model and a trained modified finite state machine as described herein. For example, the FSM-based mapping system 102 may train and/or access a trained modified finite state machine associated with each custom data format and/or source system from which at least one data record is received. In some embodiments, the FSM-based mapping system 102 trains one or more trained modified finite state machines to perform such mapping for data records received from the external data system 104 in a first custom data format and for data records received from the external data system 106, as described herein.

The FSM-based mapping system 102 includes an FSM-based mapping server 102A and an FSM-based mapping repository 102B. The FSM-based mapping server 102A may include any number of computing devices embodied in hardware, software, firmware, and/or a combination thereof, that executes the various functionality for processing data records from one or more external systems. For example, in some embodiments, the FSM-based mapping server 102A receives incoming data records from each external data system, such as the external data systems 104 and/or 106. Additionally or alternatively, in some embodiments, the FSM-based mapping server 102A generates and/or otherwise maintains a trained modified finite state machine for mapping a particular first custom data format to a second custom data format (e.g., from a custom data format used by the external data system to a custom format used by the FSM-based mapping system 102). In some embodiments, additionally or alternatively, the FSM-based mapping server 102A further processes the data in the second custom data format to provide particular desired functionality.

The FSM-based mapping server 102A may include any number of server device(s). For example, in some embodiments, the FSM-based mapping server 102A is embodied by a single specially configured server. Alternatively or additionally, in some embodiments, the FSM-based mapping server 102A is embodied by a plurality of specially configured servers in communication with one another. In some such embodiments, the plurality of specially configured servers may communicate locally or over a communications network such as the communications network 108. For example, in some embodiments, the FSM-based mapping server 102A includes one or more remote and/or "cloud" servers that perform such processing alone or in conjunction with one or more other sub-servers. Additionally or alternatively, it should be appreciated that in some embodiments, the FSM-based mapping server 102A is embodied by or otherwise includes one or more virtual servers embodied within a computing environment maintained by another computing device embodied in hardware, software, firmware, and/or a combination thereof.

The FSM-based mapping repository 102B may include any number of computing devices embodied in hardware, software, firmware, and/or a combination thereof, that stores and/or maintains data utilized by the FSM-based mapping server 102A for processing. For example, in some embodiments, the FSM-based mapping repository 102B includes one or more specially-configured databases that stores and retrieves data records in a particular custom format (e.g., embodied in one or more data objects, properties of such data objects, databases, data tables, and/or the like). Additionally or alternatively, in some embodiments, the FSM-based mapping repository 102B includes one or more specially-configured databases that store and/or retrieve the trained modified finite state machine(s), and/or portions thereof, associated with mapping any one of a number of various other custom data formats. The FSM-based mapping server 102A may store data to, and/or retrieve data from, the FSM-based mapping repository 102B during the processing operations described herein.

The FSM-based mapping repository 102B may include any number of computing devices embodying database(s). For example, in some embodiments, the FSM-based mapping repository 102B is embodied by a single specially configured computing memory device, system, and/or the like. Alternatively or additionally, in some embodiments, the FSM-based mapping repository 102B is embodied by a plurality of specially configured computing devices in communication with one another. In some such embodiments, the plurality of specially configured repositories may communicate locally or over a communications network such as the communications network 108. For example, in some embodiments, the FSM-based mapping repository 102B includes one or more remote and/or "cloud" repositories that perform such processing alone or in conjunction with one or more sub-repositories. Additionally or alternatively, it should be appreciated that in some embodiments, the FSM-based mapping repository 102B is embodied by or otherwise includes one or more virtual repositories embodied within a computing environment maintained by another computing device embodied in hardware, software, firmware, and/or a combination thereof.

The communications network 108 comprises any combination of computing devices embodying a public, private, and/or hybrid computing network over a particular range. In some embodiments, the communication network 108 is embodied by one or more network access points, relays, base stations, data transmission devices, cellular communication towers, and/or other communication devices. In some embodiments, the communications network 108 includes any number of non-user computing devices facilitating access to and/or embodying a public network, such as the Internet. Additionally or alternatively, in some embodiments, the communication network 108 includes one or more computing devices of a user's local network, for example one or more network access point(s) such as a modem and/or router that enable access to a public, private, or hybrid network of computing devices. It should be appreciated that communications network 108 may be accessible via any of a myriad of communication mechanisms and/or protocols, including without limitation a wired connection, a Wi-Fi connection, a cellular connection, Bluetooth, and/or the like.

Example Apparatuses of the Disclosure

Having discussed example systems structured in accordance with the present disclosure, example apparatuses configured in accordance with the present disclosure will now be described. In some embodiments, an FSM-based mapping system 102, as depicted and described with respect to FIG. 1 for example, is embodied by one or more computing systems such as the FSM-based mapping apparatus 200 as depicted and described in FIG. 2. The FSM-based mapping apparatus 200 includes processor 202, memory 204, input/output circuitry 206, communications circuitry 208, mapping training circuitry 210, trained mapping circuitry 212, and mapping modification circuitry 214. The FSM-based mapping apparatus 200 may be configured, using one or more of the sets of circuitries 202, 204, 206, 208, 210, 212, and/or 214, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the FSM-based mapping apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or coprocessor or any other processing circuitry assisting or otherwise associated with the processor) may be in communication with the memory 204 via a bus for passing information among components of the FSM-based mapping apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the FSM-based mapping apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the FSM-based mapping apparatus 200, and/or one or more remote or "cloud" processor(s) external to the FSM-based mapping apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations associated with improved sequential semi-structured data mapping and/or training functionality, for example as described with respect to the FSM-based mapping system 102. In some embodiments, the processor 202 includes hardware, software, firmware, and/or a combination thereof, that identifies sequential semi-structured input data associated with a first custom data format. Additionally or alternatively, in some embodiments, the processor 202 includes hardware, software, firmware, and/or a combination thereof, that identifies database structured output data corresponding to the sequential semi-structured input data, for example the database structured output data being associated with a second custom data format. Additionally or alternatively, in some embodiments, the processor 202 includes hardware, software, firmware, and/or a combination thereof, that generates, utilizing a state extractor model, an untrained modified finite state machine associated with the first custom data format. Additionally or alternatively, in some embodiments, the processor 202 includes hardware, software, firmware, and/or a combination thereof, that trains a trained modified finite state machine that maps the first custom data format to the second custom data format. Additionally or alternatively, in some embodiments, the processor 202 includes hardware, software, firmware, and/or a combination thereof, that stores the trained modified finite state machine and/or utilizes the trained modified finite state machine to perform any of a myriad of actions, including for example mapping a set portion of sequential semi-structured input data. Additionally or alternatively, in some embodiments, the processor 202 includes hardware, software, firmware, and/or a combination thereof, that enables configuring of one or more aspects of the untrained modified finite state machine and/or configuring of one or more aspects of the trained modified finite state machine.

In some embodiments, the FSM-based mapping apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the FSM-based mapping apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 208 may include circuitry for interacting with the antenna(s)

and/or other hardware or software to cause transmission of signals via the antenna(s) or to handle receipt of signals received via the antenna(s).

The mapping training circuitry 210 includes hardware, software, firmware, and/or a combination thereof, configured to support various generation of trained modified finite state machines that map from a first custom data format to a second custom data format. For example, in some embodiments, the mapping training circuitry 210 includes hardware, software, firmware, and/or a combination thereof, configured to identify sequential semi-structured input data associated with a first custom data format and/or database structured output data associated with a second custom data format and corresponding to the sequential semi-structured input data. Additionally or alternatively, in some embodiments, the mapping training circuitry 210 includes hardware, software, firmware, and/or a combination thereof, configured to generate and/or maintain a state extractor model for use in generating one or more untrained modified finite state machines. Additionally or alternatively, in some embodiments, the mapping training circuitry 210 includes hardware, software, firmware, and/or a combination thereof, configured to generate, utilizing a state extractor model, an untrained modified finite state machine associated with the first custom data format. Additionally or alternatively, in some embodiments, the mapping training circuitry 210 includes hardware, software, firmware, and/or a combination thereof, configured to train a modified finite state machine that maps the first custom data format to the second custom data format via one or more mapping-based actions based at least in part on the sequential semi-structured input data, the untrained modified finite state machine associated with the first custom data format, and the database structured output data. Additionally or alternatively, in some embodiments, the mapping training circuitry 210 includes hardware, software, firmware, and/or a combination thereof, configured to store one or more trained modified finite state machine, for example a trained modified finite state machine for each custom data format associated with sequential semi-structured input data. Additionally or alternatively, in some embodiments, the mapping training circuitry 210 includes hardware, software, firmware, and/or a combination thereof, configured to enable configuring the untrained modified finite state machine and/or the modified finite state machine.

In some embodiments, the mapping training circuitry 210 performs one or more of the above-mentioned actions using, in whole or in part, the communications circuitry 208, input/output circuitry 206, and/or processor 202. For example, the mapping training circuitry 210 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, mapping training circuitry 210 may include a separate processor, specially configured field programmable gate array (FPGA), or a specially programmed application specific integrated circuit (ASIC).

The mapping execution circuitry 212 includes hardware, software, firmware, and/or a combination thereof, configured to support various functionality for mapping input data utilizing one or more trained modified finite state machine(s). For example, in some embodiments, the mapping execution circuitry 212 includes hardware, software, firmware, and/or a combination thereof, configured to receive sequential semi-structured input data associated with a first custom data format. Additionally or alternatively, in some embodiments, the mapping execution circuitry 212 includes hardware, software, firmware, and/or a combination thereof, configured to identify the custom data format associated with sequential semi-structured input data, and/or identify a trained modified finite state machine corresponding to the identified custom data format. Additionally or alternatively, in some embodiments, the mapping execution circuitry 212 includes hardware, software, firmware, and/or a combination thereof, configured to utilize the identified trained modified finite state machine for the identified custom data format to generate newly formatted output data of the second custom data format from the sequential semi-structured input data of the first custom data format. Additionally or alternatively, in some embodiments, the mapping execution circuitry 212 includes hardware, software, firmware, and/or a combination thereof, configured to store and/or process the newly formatted output data of the second custom data format.

In some embodiments, the mapping execution circuitry 212 performs one or more of the above-mentioned actions using, in whole or in part, the communications circuitry 208, input/output circuitry 206, and/or processor 202. For example, the mapping execution circuitry 212 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, mapping execution circuitry 212 may include a separate processor, specially configured field programmable gate array (FPGA), or a specially programmed application specific integrated circuit (ASIC).

The mapping modification circuitry 214 includes hardware, software, firmware, and/or a combination thereof, configured to support functionality for viewing and/or modifying one or more state(s). For example, in some embodiments, the mapping modification circuitry 214 includes hardware, software, firmware, and/or a combination thereof, that enables causing rendering of one or more user interfaces associated with viewing state(s) of a human-readable and editable format. Such an interface may enable a user to view information associated with a particular state, information cell mappings embodied by or otherwise associated with the state (e.g., output data columns to map the input data), state transitions between the state and another state or multiple possible states with corresponding transition weights, and/or the like. Additionally or alternatively, modifying the state may include deleting an existing state, adding a new state and/or corresponding state transitions, selecting between possible state transitions (e.g., based on a mapping weight), and/or editing information cell states to map to a particular portion or property of the output data in a custom data format (e.g., output data columns to which a state is mapped). In some embodiments, the mapping modification circuitry 214 includes hardware, software, firmware, and/or a combination thereof, for viewing and/or modifying one or more extracted states of a set of extracted states identified via a state extractor model as described herein, and/or a state of a modified finite state machine as described herein. In some such embodiments, the mapping modification circuitry 214 includes hardware, software, firmware, and/or a combination thereof that receives user input data embodying modification of one or more of such state(s). For example, the user input data may embody deletion of, addition of, or modification of one or more state(s), mapping(s) between such state(s), and/or the like. Additionally or alternatively still, in some embodiments, the mapping modification circuitry 214 includes hardware, software, firmware, and/or a combination thereof, that enables user selection of a state transition from a first state to a particular selected state from state transitions to two or more possible states.

In some embodiments, the mapping modification circuitry 214 performs one or more of the above-mentioned actions using, in whole or in part, the communications circuitry 208, input/output circuitry 206, and/or processor 202. For example, the mapping modification circuitry 214 may leverage the communications circuitry 208 to perform data receiving and/or transmitting steps, and/or may leverage the input/output circuitry 206 to perform user outputting (e.g., rendering of user interfaces) and/or user inputting steps. It should be appreciated that, in some embodiments, mapping modification circuitry 214 may include a separate processor, specially configured field programmable gate array (FPGA), or a specially programmed application specific integrated circuit (ASIC).

It should be appreciated that, in some embodiments, one or more of the sets of circuitries 202-212 are combinable. Alternatively or additionally, in some embodiments, one or more of the modules performs some or all of the functionality described associated with another component. For example, in some embodiments, the sets of circuitry 210 and 212 are combined into a single module embodied in hardware, software, firmware, and/or a combination thereof. Similarly, in some embodiments, one or more of the sets of circuitry 210 and/or 212 is combined such that the processor 202 performs one or more of the operations described above with respect to each of these modules.

Example Data Visualizations of the Disclosure

Having described example systems and apparatuses in accordance with the present disclosure, visualizations of data-level interactions in accordance with the present disclosure will now be discussed. It should be appreciated that the data elements depicted and described may be embodied within software computing environments executed on one or more of the computing devices described herein. For example, one or more of the described data elements may be embodied as data object(s) maintained by a particular application executed by and/or otherwise accessible to one or more computing devices, such as the FSM-based mapping apparatus 200 in communication with one or more external data systems. It should be appreciated that data objects may be transmitted between applications on different computing devices over one or more computing networks, and/or may be transmitted between applications on a single computing device to enable the operations described herein.

FIG. 3 illustrates a visualization of example data object mapping in accordance with at least some embodiments of the present disclosure. Specifically, FIG. 3 illustrates a mapping of an incoming data object 302 of a custom data format 302A to output data of a second custom data format embodied by updated data records 304A-304C, each associated with a custom data schema 304A. It should be appreciated that the incoming data object 302 may be one of a plurality of incoming data objects received for processing, such as part of an incoming data object set. In this regard, the mapping process described with respect to the incoming data object 302 may similarly be performed for any number of incoming data objects.

In some embodiments, the incoming data object 302 is received from a particular external data system. The incoming data object 302 may include any of a number of properties, and/or corresponding values for such properties, determined and/or otherwise utilized by the external data system. In this regard, each incoming data object 302 may be formatted according to a custom data format. For example, as illustrated, the incoming data object 302 may be organized in accordance with the custom data format 302A. The custom data format 302A may define how the various data properties and/or corresponding values embodied by the incoming data object 302 are represented. A non-limiting example of a custom data format is depicted and described with respect to FIG. 4.

It should be appreciated that, in some embodiments, incoming data objects from different external data systems are embodied by different custom data formats. In this regard, the FSM-based mapping apparatus 200 may identify and/or otherwise determine the custom data format associated with particular incoming data object(s) based on information identifying the external data system from which the incoming data object was received. For example, a particular trained modified finite state machine associated with a particular incoming data object, custom data format, and/or source external data system may similarly be identified to enable mapping of the incoming data object.

In some embodiments, the incoming data object 302 is parsed to identify one or more data values corresponding to data properties of the incoming data object 302 for processing. For example, in some embodiments, the incoming data object 302 is parsed to extract various individual tuples (e.g., rows) of the incoming data object 302, and/or individual data values of a particular tuple. Each tuple of the incoming data object 302 may be separated by a first delimiter (e.g., a line break or carriage return), and/or each data property may be separated by a second delimiter (e.g., an asterisk or another reserved character). In some embodiments, a data parser 350 embodied in hardware, software, firmware, and/or a combination thereof, performs the data parsing of the incoming data object 302 into various portions for processing. In some embodiments, the data parser 350 is embodied by a separate computing device from the FSM-based mapping apparatus 200. Alternatively or additionally, in some embodiments, the data parser 350 is embodied by the FSM-based mapping apparatus 200 and/or embodied by a sub-system or component of the FSM-based mapping apparatus 200.

In some embodiments, the data parser 350 is configured to identify and/or otherwise extract file format information associated with the custom data format 302A of the incoming data object 302. For example, the data parser 350 may identify file format information from a file format specification included in or otherwise associated with the incoming data object 302. The file format information may include various information associated with the individual data elements, groupings of data elements, and/or arrangement of data elements of the incoming data object 302. For example, the file format information may identify when certain data tuples (e.g., rows) of the incoming data object 302 are all associated with a particular data object, such that the data tuples should be considered grouped for purposes of processing such information. In a particular context, for example, the file format information may indicate that the occurrence of a certain data string (e.g., "INS") indicates the beginning of information that is associated with a particular data object (e.g., a member data object) for any number of rows until another particular data string indicating the end of the data object has been reached (e.g., a string of characters, an empty line, and/or the like). Such information may be stored and/or utilized when generating a state extractor model, utilizing a state extractor model, utilizing a trained modified finite state machine, and/or otherwise for processing incoming data object(s) associated with such file format. It should be appreciated that file format information for a particular incoming data object and/or custom data format may include indicators for any number of groupings for data tuples, data elements within a tuple, and/or the like, and/or indicate which particular indicator(s), data string(s), and/or the like identify such groupings.

The FSM-based mapping apparatus 200 maps the incoming data object 302 to corresponding output data. The FSM-based mapping apparatus 200 may utilize a particular trained modified finite state machine to map the incoming data object 302 to the corresponding output data. For example, the FSM-based mapping apparatus 200 may identify and utilize a trained modified finite state machine specifically trained for the custom data format 302A to map the incoming data object 302 to the output data.

The FSM-based mapping apparatus 200 maps the incoming data object 302 to particular output data embodied by one or more columns of one or more databases. The databases may be maintained by the FSM-based mapping apparatus 200 and/or one or more associated computing devices. For example, as illustrated, the output data is embodied by the updated data record 304. In some embodiments, the output data is embodied by a single data object, for example the updated data record 304 embodying a particular record of a table in a database. In some such embodiments, the values for the updated data record may be determined based on the mappings between the custom data format 302A and the data schema 304A In this regard, each column (or property) defined in the custom data format 302A of the updated data record 304 may be mapped to a particular column (or property) of the incoming data object 302 defined in the data schema 304A. Alternatively or additionally, in some embodiments, the output data object is embodied by multiple data objects, for example the updated data record 304 in conjunction with one or more additional updated data records of other tables and/or databases. For example, different portions of the incoming data object 302 are mapped to different columns of a table in a database, different columns in multiple tables of a database, and/or different columns in various tables of various databases.

The FSM-based mapping apparatus 200 may map the custom data format 302A to the custom data format for the output data represented by the data schema 304A. The mappings between the custom data format 302A and the data schema 304A may be defined by a particular trained modified finite state machine corresponding to the custom data format 302A. The FSM-based mapping apparatus 200 may train a trained modified finite state machine that represents such mappings, as described herein.

FIG. 4 illustrates a visualization of an example mapping from a first custom data format to a second custom data format in accordance with at least some embodiments of the present disclosure. Specifically, FIG. 4 depicts a mapping from data of a first custom data format 400 (e.g., sequential semi-structured input data) to data of a second custom data format 450 (e.g., sequential semi-structured output data). It should be appreciated that the particular mappings depicted are exemplary, and in other contexts alternative mappings may be generated.

The data of the first custom data format 400 includes various individual data portions. For example, each row of the data of the first custom data format 400 may define a different portion of the data. In some such embodiments, each data portion may be processable independently from the other data portions of the data. In some other embodiments, each data portion may inform other portions of the data for processing. The relationship between the various portions of the data of the first custom data format 400 may be defined by various states and transitions between the states.

In some embodiments, various states are extracted from the custom data format 400, as depicted. For example, in some embodiments, the FSM-based mapping apparatus 200 is configured to extract the various depicted states utilizing a state extractor model. The state extractor model may embody a statistical model that extracts such states based on the statistical presence of particular patterns, symbols, and/or data values in a set of analyzed data.

Specifically, as illustrated, the data of the first custom data format 400 includes a plurality of rows, each row comprising a tuple of data values. In this regard, it should be appreciated that, in some embodiments, each tuple may be processed independently from one another. In other embodiments, one or more tuples is associated with or otherwise informs the processing of a subsequent data value. In this regard, a data value in a first tuple, for example, may provide context related to what is represented by a data value of a second tuple. Such tuples may be immediately following one another, separated by one or more intermediary tuples, and/or the like. For example, a particular tuple may include one or more data values that inform the processing of a section of subsequent tuples (e.g., a plurality of subsequent rows).

The data of the first custom data format 400 is separated by one or more delimiters between various elements of the data. For example, each data element represented by one or more alphanumeric characters of the data of the custom data format 400 is separated by an asterisk delimiter 450 (*) as depicted. Each delimiter may separate data values for different data properties in a portion of sequential semi-structured data. For example, each delimiter may separate data values for different data properties represented in a tuple/row of the sequential semi-structured data. In this regard, each data value may be processed to determine whether the data value represents data corresponding to an information cell state, an intermediary state, or root state associated with the custom data format. In this regard, the state extractor model may identify particular elements representing states and state transitions between such states based on the relationship between such elements as they appear in the data of the custom data format 400. Additionally or alternatively, in some embodiments, different portions of the custom data format 400 (e.g., each tuple) are separated by the same or a different delimiter, for example a line break or a carriage return character.

In some embodiments, each tuple is determined to begin with a root state. The subsequent data values, as parsed and/or otherwise identified based on one or more delimiters in the tuple, may be processed to determine whether such subsequent data values inform subsequent states (e.g., information cell states, intermediary states, and/or action states). In some such embodiments, a state extractor model generates an impurity metric used to determine and/or otherwise identify subsequent intermediary state(s) and/or information cell state(s) as such subsequent data values are processed.

The context and/or corresponding mappings associated with one or more state(s) may be determined based on the data value of the state, the data value of previous state(s), and/or previous portion(s) of the sequential semi-structured input data. In some embodiments, the context represented by one or more data values depends on another data value in the present tuple (e.g., row of the sequential semi-structured data) and/or a prior tuple. For example, a previous data value from another tuple may indicate that the current data value should be mapped to a particular data property of the output custom data format (e.g., an output table column), and/or a particular database action state to be performed for a subsequent data value.

In at least one example context, an action state to be performed associated with a subsequent data value, or a plurality of data values, depends on the processing of one or more data value(s) from a previous row. For example, in one example context, a current tuple being processed includes the data string "NM1*70*1*DOE*JAMES*E~." Processing of this tuple, for example via a state extractor, may determine corresponding extracted states for updating a name associated with a user. The previous tuple may include the data string "INS*Y*021*20*A**FT~," which the state extractor may process to determine that the subsequent tuple includes contextual data for updating a name (e.g., a subscriber or dependent), thus adding the data values represented in the presently processed tuple to one or more data columns of the output data. In this regard, the previous tuple embodying an earlier portion of the sequential semi-structured input data provides context for processing a subsequent tuple embodying a later portion of the sequential semi-structured input data.

As illustrated, the data of the custom data format 400 includes a plurality of root states. For example, the plurality of root states includes root states embodied by the data elements 402A, 404A, 406A, and 408A. Each of the root states may be determined as a starting state for a particular portion of the data of the first custom data format 400, where the root states binds the correlated states and information cells for a tuple of the sequential semi-structured input data. In some embodiments, one or more states is preconfigured as a root state, for example based on manual creation and/or association with a standard data format. For example, one or more root states may be predetermined, for example as representing a start of a particular data record and/or section of data. As depicted, for example, data element 402A "INS" may be treated as the start of a member record without deduction from the state extractor model. In some embodiments, the groupings of data portions (e.g., different tuples in the data of the first custom data format 400) are determinable from a file format specification associated with the data of the first custom data format 400. In this regard, the output mappings associated with a particular portion of data may be informed based on the relationship between tuples defined by the file format specification. For example, the "INS" state at the beginning of a row may indicate that the following data portions (e.g., in the same tuple and subsequent tuples) all are associated with the same data object, such as a member data object, until another particular identifier is reached. In some embodiments, a data parser extracts, identifies, and/or otherwise determines the file format information embodying a file format specification associated with particular incoming data.

Alternatively or additionally, one or more root states may be determined by the state extractor model. In some embodiments, a state extractor model determines the data elements 404A, 406A, and 408A embody root states based on the statistical likelihood of such data elements appearing at the start of one or more data elements of training data, such as of the data of the first custom data format 400. Each of the root states may indicate that different information of the remaining data elements, actions to perform, and/or the like, is represented in remaining portions of the same data element (e.g., the same row) as the root state, and/or is represented in particular remaining portions of different data elements of the data of the first custom data format 400. In this regard, the relationships between such states may be determined by a state extractor model and represented by state transitions between the various extracted states.

The data of the custom data format 400 includes a plurality of intermediary states. For example, the plurality of intermediary states includes intermediary states 402B-402G, 404B, 406B, and 408B-408C. Each of the intermediary states may inform different portions of information, actions to be performed with respect to the different portions of information, and/or the like. For example, each of the intermediary states 402B-402G, 404B, 406B, and 408B-408C may each inform various aspects of the remaining data in the same data element, and/or data portions of other data elements, of the data of the custom data format 400. In this regard, the intermediary states help to navigate through the modified FSM in a manner that informs the mapping between a subsequent information cell and a data value of a second format.

In some embodiments, one or more intermediary states provide context and/or otherwise inform mappings from a first custom data format associated with input data to particular portions of the custom data format associated with the output. For example, such mappings may embody a determined output column of the target custom data format corresponding to a particular data value of the input data. For example, an intermediate state may differentiate between whether a subsequent data value should be mapped to or otherwise corresponds to a first output column or a second output column associated with the target custom data format.

Additionally or alternatively, one or more intermediary states determine an action state to be performed, where the action is associated with a particular portion of the custom data format associated with the output. For example, an intermediate state may differentiate between whether a subsequent data value corresponds to updating of data in a data column of an output record, deletion of a data column or data record, and/or the like. Particularly, in the example data string "INS*Y*18*021*20*A***FT~," the data value "021" may correspond to a database addition action, for example addition of a subscriber or dependent data column, whereas "024" may correspond to a database deletion action, for example deletion of a subscriber or dependent data column. In this regard, one or more action state(s) may be included based on the identified intermediate states.

The data of the custom data format 400 includes a plurality of information cell states. For example, the plurality of information cell states includes information cell states 404C, 406C, and 408D. Each of the information cell states may represent particular data values for one or more properties defined by root and/or intermediary states. For example, each information cell state may represent a particular data property that is defined based on one or more other states of the data of the custom data format 400. The data property represented by a particular information cell state may be determined based on a relationship determined between the various extracted states. In this regard, each information cell state represents information and/or data values to be mapped to a portion of the custom data format associated with the output data, for example mapping of information of a particular type to a corresponding output column.

A particular data portion of sequential semi-structured input data may include any number of information cell states. In some embodiments, a single row of sequential semi-structured input data (e.g., embodying a tuple) may include a plurality of information cell states corresponding to one or more data properties (e.g., data column(s)) of the second custom data format. For example, a single tuple of sequential semi-structured input data, such as an address row of sequential semi-structured input data, may include information cells corresponding to a city output column, a state output column, a zip code output column, a street address output column, and/or the like.

The FSM-based mapping apparatus 200 may utilize the extracted states from the associated with the data of the custom data format 400 to generate a trained modified finite state machine including such states. In the trained modified finite state machine, each information cell states 404C, 406C, and 408D may be mapped to a particular property of a second custom data format, for example a second custom data format used by the FSM-based mapping apparatus 200. In one example context, for example, each information cell state may be mapped to a particular column of one or more tables in a database maintained by and/or otherwise utilized by the FSM-based mapping apparatus 200. It should be appreciated that such mappings may be learned by the trained modified finite state machine from a plurality of input data of the first custom data type (e.g., utilized as input training data) paired with a plurality of output data of the second custom data type (e.g., utilized as output training data).

As illustrated, the data of the second custom data format 450 includes a visualization of such mappings. Specifically, each information cell state has been replaced with a corresponding data property of the second data format with which the information cell state is mapped. In this regard, utilizing the trained modified finite state machine to navigate the various extracted states for particular input data, in a circumstance where the trained modified finite state machine terminates at the information cell state, the data value for such a state may be utilized to perform one or more actions associated with the corresponding data property of the second custom data format 450.

For example, as depicted, the trained modified finite state machine maps the information cell state 404C to a data column represented by 454. The data column 454 embodies a particular column "SBCR_ID_NUMBER" of a table "MBR"—for example representing a subscriber identification number of a member table of a data repository associated with a healthcare insurance provider. The data column 456 embodies a particular column "GROUP_POLICY_ID" of the table "MBR"—for example representing a group policy identifier of a member table of a data repository associated with a healthcare insurance provider. The data column 458 embodies a particular column "POLICY_ST_DT" of the table "MBR"—for example representing a policy start date of a member table of a data repository associated with a healthcare insurance provider. In this regard, it should be appreciated that the mapping embodied by the trained modified finite state machine representing mappings between particular data properties in the data of the first custom data format 400 and corresponding data columns as depicted in the data of the second custom data format 450. Such mappings between the data properties and the data columns may be informed based on the various states and the data transitions between such states as determined by the state extractor model, as described herein.

Example Detailed Processing Implementations of the Disclosure

Having described example systems, apparatuses, computing environments, and data processed in accordance with the present disclosure, example detailed processing implementations of the present disclosure will now be described. It should be appreciated that the various components of the processing implementation may be embodied in software and/or firmware executed on specially configured hardware. For example, the various components as described may be embodied by specially configured software processes and/or applications executed using specially configured hardware, software, and/or firmware. In at least one embodiment, a custom data format mapping application comprising any number of sub-processes for performing the various data manipulations as described.

FIG. 5 illustrates a visualization of data interactions between components of an computing environment of an example detailed implementation for generating a trained modified finite state machine for mapping from a first custom data format to a second custom data forma tin accordance with at least some embodiments of the present disclosure. Specifically, as illustrated, FIG. 5 includes a plurality of components that interact to perform the various operations for mapping of custom sequential semi-structured data. In this regard, each component may be embodied in software, hardware, firmware, and/or a combination thereof, that performs the various data manipulation as described herein. The various components may each process particular data for generating the trained modified finite state machine for use. For example, in one or more embodiments, the FSM-based mapping apparatus 200, maintains the various components as software components and utilizes such components to perform the described operations.

For example, as illustrated, apparatus 200 identifies validated input data 502A. The validated input data 502A may be embodied in a particular, first custom data format. It should be appreciated that the validated input data 502A may include any number of data records utilized for training. In this regard, the validated input data 502A may embody a training data set for purposes of training one or more model(s) based on such training data.

In some embodiments, the validated input data 502A is received from an external data system. Alternatively or additionally, in some embodiments, the validated input data 502A is retrieved from one or more data repositories storing such validated input data. For example, the validated input data 502A may be collected and/or stored to the one or more data repositories of the FSM-based mapping apparatus 200 over time for subsequent retrieval, and/or retrieved from one or more external repositories, data aggregation systems, and/or the like. The validated input data 502A may include any number of individual data records sufficient for training one or more model(s) with sufficient accuracy.

In some embodiments, the validated input data 502A is used to train a state extractor model 504. The state extractor model 504 may be embodied by one or more statistical models that detect and/or otherwise extract states associated with the first custom data format based on the validated input data 502A. In this regard, the state extractor model 504 may learn, from the validated input data 502A, the statistical prevalence of data elements representing particular states, and the relationships between them. In this regard, based on the statistical prevalence of particular data values and relationships between such data values, the state extractor model 504 learns the data values embodied in the validated input data 502A that represent states of such data mapping for inclusion in a modified finite state machine for mapping from the first custom data format of the validated input data 502A. Additionally, the state extractor model 504 may learn the relationships between such data values embodying state transitions between the various states embodied by such data values.

In this regard, the state extractor model 504 produces a set of states and corresponding state transitions. The set of states and corresponding state transitions embody an untrained modified finite state machine 506. In this regard, the untrained modified finite state machine 506 may be embody a "skeleton" finite state machine, which may include one or more template states that lack particular mappings to a second custom data format. In this regard, for example, the untrained modified finite state machine 506 may include or otherwise indicate one or more information cell states to be mapped to a particular property of the second custom data format (e.g., a particular database column, and/or the like). A non-limiting example of an untrained modified finite state machine 506 is described herein with respect to FIG. 6.

In some embodiments, the various states embodying the untrained modified finite state machine 506 are represented in a human-readable and editable data format. For example, in some embodiments, the states and/or state transitions between the states embodying the untrained modified finite state machine 506 are represented in a JSON format. As such, a user may view the states and/or state transitions embodying the untrained modified finite state machine 506 and alter one or more states and/or state transitions if desired. For example, in some embodiments, the user may alter and/or delete one or more states in circumstances where a learned state is not truly a state, but is improperly learned from the validated input data 502A.

The FSM-based mapping apparatus 200 subsequently generates a trained modified finite state machine 508. The trained modified finite state machine 508 includes one or more specially configured states that map to particular data properties (e.g., data columns, and/or the like) of a second custom data format. For example, the trained modified finite state machine 508 may include one or more information cell states mapped to such particular data properties, and/or action states associated with updating such data properties.

The mappings to particular data properties of a second custom data format may be learned from particular training data of the second custom data format. For example, in some embodiments, the FSM-based mapping apparatus 200 identifies validated output data 502B, the validated output data 502B embodied in the second custom data format. In this regard, particular portions of the validated input data 502A may each be mapped to corresponding portions of the validated output data 502B. In some such embodiments, the validated input data 502A and/or validated output data 502B may be organized such that each data object of the validated input data 502A (or other portion of the validated input data 502A) is associated with a corresponding data object of the validated output data 502B (or other portion of the validated output data 502B). In some embodiments, the validated output data 502B is manually generated and/or manually associated with certain portions of the validated input data 502A to accurate store such associations between the validated input data 502A and validated output data 502B.

In this regard, as illustrated, the trained modified finite state machine 508 may be generated based on the untrained modified finite state machine 506, validated input data 502A, and validated output data 502B. Utilizing such data, the FSM-based mapping apparatus 200 generates the trained modified finite state machine 508 by learning the associations from the validated input data 502A of the first custom data format to the validated output data 502B of the second custom data format, and including information cell states and/or action states that represent such mappings in the untrained modified finite state machine 506. In this regard, the additional states are altered from and/or added to the untrained modified finite state machine 506 to configure the trained modified finite state machine 508 to represent mappings specifically to the second custom data format represented by the validated output data 502B. A non-limiting example of a trained modified finite state machine 508 is depicted and described herein with respect to FIG. 7.

The trained modified finite state machine 508 may be embodied by or otherwise include a linked modified finite state set 510. The linked modified finite state set 510 be embodied by data that represents the various states of the trained modified finite state machine and/or state transitions between such states. In this regard, the various states of the linked modified finite state set 510 may represent such data in a human-readable and editable data format. For example, in some embodiments, the trained modified finite state machine 508 is embodied by the linked modified finite state set 510 in a JSON format. As such, a user may view the linked modified finite state set 510 embodying the trained modified finite state machine 508 and alter one or more states if desired. For example, in some embodiments, the user may alter and/or delete one or more states in circumstances where a learned state is not truly a state, or is mapped to one or more possible data columns.

The linked modified finite state set 510, embodying the trained modified finite state machine 508 and/or as altered based on one or more user inputs may store to one or more repositories. For example, as illustrated, the FSM-based mapping apparatus 200 stores the linked modified finite state set 510 embodying the trained modified finite state machine 508 to a mapping repository 512. The linked modified finite state set 510 may be stored associated with data that uniquely identifies the first custom data format, a source system associated with the first custom data format, and/or the like. In this regard, the linked modified finite state set 510 embodying the trained modified finite state machine 508 may later be retrieved and/or otherwise utilized for performing mapping-based actions for mapping subsequent received input data of the first custom data type. For example, in some embodiments, the FSM-based mapping apparatus 200 and/or a related computing system may retrieve the linked modified finite state set 510 embodying the trained modified finite state machine 508 for use in a data mapping engine that maps incoming data objects as they are received from one or more external data systems, as described herein.

Example Visualizations of Finite State Machines of the Disclosure

FIG. 6 illustrates an example untrained modified finite state machine 600 including a set of extracted states and state transitions associated with mapping from a first custom data format in accordance with at least some example embodiments of the present disclosure. For example, the untrained modified finite state machine 600 may represent extracted states and/or state transitions learned from the validated input data 502A of the first custom data format utilizing a state extractor model 504. It should be appreciated that the visualization depicted includes merely a portion of the untrained modified finite state machine 600, and in other implementations, an untrained modified finite state machine may have any number of states (e.g., hundreds, thousands, and/or more) and/or any number of state transitions between such states (e.g., hundreds, thousands, and/or more).

As illustrated, the untrained modified finite state machine 600 includes a start state 650 that transitions into any of a number of root states 602A-602B. In this regard, the root states may be learned as starting any number of data objects (e.g., data elements) of the validated input data from which the untrained modified finite state machine 600 was generated. It should be appreciated that any number of root states may be learned from validated input data, for example, based on the prevalence of such data values at the beginning of data objects in the validated input data set.

Each of the root states 602A-602D may transition to any of a number of intermediary states. As illustrated, for example, the start state 602B (e.g., representing the data value "REF") transitions to any one of the intermediary states 604A-604C. Each of the intermediary states 604A-604C may represent a subsequent state learned state from the "REF" start state 602B. In this regard, the intermediary states 604A-604C may represent additional context associated with a data value for a subsequent data property. It should be appreciated that any number of intermediary states may be learned from the validated input data for a previous state (e.g., a root state or another intermediary state), for example, based on the prevalence of such data values following the previous state in the sequential order of the validated input data.

Each of the intermediary states 604A-604C is associated with one of particular information cell states 610A-610C, respectively. In this regard, each of the information cell states 610A-610C may represent a data property of the validated input data to be mapped to a corresponding data property of validated output data of a second custom data format. As depicted, the information cell states 610A-610C are not yet mapped to any data properties. In this regard, the mappings of each information cell state may be learned during generation of a trained modified finite state machine based on the untrained modified finite state machine 600, the validated input data utilized to generate the untrained modified finite state machine 600, and the validated output data of a second custom data format to which the validated input data is to be mapped.

As described, in some embodiments, an information cell state represents a final state for a particular path (e.g., for processing a path from a root state). In other embodiments, a plurality of information cell states are associated with a single path from a particular root state. For example, a single tuple (e.g., a row) of the sequential semi-structured input data may include a plurality of information cell states each mapped to a data property of the validated output data of a second custom data format. In this regard, each of the plurality of information cells may be mapped to a particular output column within a single tuple of the sequential semi-structured input data (e.g., information cell states each representing a home phone number, a work phone number, and a cell phone number for a particular subscriber).

It should be appreciated that, based on the statistical prevalence of data values within portions of the validated input data, different states may be associated with state transitions to any number of other states. For example, as depicted, the "DTP" root state 602D is associated with a state transition to the intermediary state 606A representing the data property "007." Further, the "007" intermediary state 606A is associated with a state transition to the "D8" intermediary state 608A and the "RD8" intermediary state 608B. The "D8" intermediary state 608A is associated with an information cell state 612A, and the "RD8" intermediary state 608B is associated with an information cell state 612B.

In this regard, the transitions between states may add context to the particular data properties represented by each state. For example, in some custom data formats, the "DTP" root state 602D may indicate that subsequent states represent particular dates, datetimes, and/or the like. The "007" intermediary state 606A may indicate that subsequent states represent datetimes of effective datetime(s) of particular data, for example enrollment and/or subscription to particular healthcare insurance plans of a particular healthcare insurance provider. The "D8" intermediary state 608A may indicate that subsequent states represent datetimes in a first particular format (e.g., a CCMMYYDD format). The information cell state 612A may thus represent a corresponding mapping to a data property of a second custom data format to be filled in for such data values representing the full context of the traversed states (e.g., a CCMMYYDD datetime representing the datetime of effective subscriber enrollment in a healthcare insurance plan, in one example context). The "RD8" intermediary state 608A may indicate that subsequent states represent a range of datetimes in a first particular format (e.g., a range in CCMMYYDD-CCMMYYDD format). In this regard, the information cell state 612B may thus represent a corresponding mapping to a second data property of a second custom data format to be filled in for such data values representing the full context of the traversed states (e.g., a range of CCMMYYDD-CCMMYYDD datetimes representing the range of effective subscriber enrollment in a healthcare insurance plan in one example context). In this manner, the untrained modified finite state machine 600 represents a skeleton finite state machine that represents the contextual relationships between extracted states from the first custom data format, and for which mappings to a second custom data format are to be included.

FIG. 7 illustrates an example trained modified finite state machine 700 including a set of states and state transitions configured to map from a first custom data format to a second custom data format in accordance with at least some example embodiments of the present disclosure. Specifically, the trained modified finite state machine 700 embodies the untrained modified finite state machine 600 with mapping learned for a particular second custom data format. For example, the learned mappings represent mappings from data properties of the first custom data format to data properties of the second custom data format. The data mappings may be associated with one or more information cell states and/or action states.

In some embodiments, the trained modified finite state machine is embodied such that each state and/or transitions between states are learned based on mapping weights between such states. For example, in some embodiments, the trained modified finite state machine by the septuple ($\Sigma$, S, $s_0$, $\delta$, F, A, $\omega_S$). In said septuple, $\Sigma$ is a finite non-empty set of symbols embodying an input alphabet. Additionally, S is a finite non-empty set of states, for example embodied by the extracted states representing the untrained modified finite state machine. Additionally, $s_0$ is an initial state from the non-empty set of states S, for example an initial state of the set of states representing the untrained modified finite state machine. A is a non-empty set of actions that can be taken after every state transition, for example representing data transformation, data interpretation, insertion into database tables, and/or the like. $\omega_S$ is a set of mapping weights assigned to various actions for a specific state from S, wherein the mapping weight for an action is calculated based on at least a frequency of transition path occurrence for a path from the specific state to a corresponding action. In this regard, the statistical prevalence of a particular occurrence of a state transition to another state in the validated input data represents the mapping weight for said state transition. δ is a state-transition function embodied by δ:S×Σ→S, A($\omega_S$). F is a set of final states embodying a subset of S. It should be appreciated that the set of final states may embody an empty subset. Non-limiting examples of the set of final states include table columns, inferences in a Bayesian context, and/or the like.

Based on this septuple, the set of states is already extracted via the state extractor model as described. Subsequent training for generating the trained modified finite state machine may be performed based on plausible traversal paths. In this regard, the mapping weights represented by $\omega_S$ are updated for every traversal that is made for a potential action. An example resulting trained modified finite state machine from the untrained modified finite state machine 600 is depicted and described as the trained modified finite state machine 700.

For example, as described, the context formed by the "DTP" root state 602D, "007" intermediary state 606A, and "D8" intermediary state 608A represents an effective start date in CCYYMMDD format. In this regard, through learning from the corresponding validated output data, the information cell state 612A is updated to represent a mapping to a corresponding particular data property representing the effective start date in CCYYMMDD format of the information cell state 702E. Similarly, the information cell state 612B is updated to represent a mapping to a corresponding particular data property representing the effective start date range in CCYYMMDD-CCYYMMDD the format of the information cell state 702F.

As depicted, the remaining information cell states are similarly mapped to corresponding data properties of the second custom data format. For example, the information cell state 610A is updated to represent a mapping to a corresponding particular data property representing a subscriber identifier number 702A. The information cell state 610B is updated to represent a mapping to a corresponding particular data property representing a group policy number 702B.

The information cell state 610C is updated with a plurality of information cell states. In this regard, the previous state (e.g., the "17" intermediary state 604C) may be determined to be associated with multiple possible state transitions of sufficient weight to be determined statistically relevant. For example, as depicted, the state transition to the information cell state 702C may be associated with a first weight (e.g., 0.3) indicating the likelihood of a particular data value mapping to a client reporting category as indicated in the information cell state 702C, and the state transition to the information cell state 702D may be associated with a second weight (e.g., 0.7) indicating the likelihood of a particular data value mapping to a physician reporting category as indicated in the information cell state 702C. In some embodiments, for example, the FSM-based mapping apparatus 200 identifies the plurality of possible information cell states in circumstances where the weights for state transitions to such states are above a mapping weight threshold. The mapping weight threshold may be by a user, automatically determined by the FSM-based mapping apparatus 200, predetermined (e.g., always 0.1 or another data value), determined using a machine learning model, and/or the like.

In various embodiments of the present disclosure, the FSM-based mapping apparatus 200 is configured to assign a particular information cell state from a plurality of information cell states in any of a myriad of manners. For example, in some embodiments, the FSM-based mapping apparatus 200 assigns the higher weight information cell state regardless of a mapping weight threshold. Such embodiments may be performed entirely automatically, such that data mapping is performed entirely without user input. In other embodiments, the FSM-based mapping apparatus 200 enables a user to provide user input that decides the information cell state from the plurality of information cell states to assign from the plurality of information cell states above the mapping weight threshold. Such embodiments improve the accuracy of such state cell assignment determinations by enabling a user to make a final decision, while reducing the number of manual data mappings that must be performed.

In some embodiments, one or more information cell states are associated with action states that effectuate manipulation and/or processing of a data value represented by the information cell state. For example, the discussed datetime mappings, as depicted, are associated with one or more action states that effectuate required data manipulations and/or associated actions. For example, as depicted, each of the information cell states 702E and 702F are associated with state transitions to a date transformation action state 704A. The date transformation action state 704A may be associated with a particular process for transforming the data value represented by the previous state (e.g., the information cell state 702E or 702F) to a desired datetime format.

Additionally, each of the information cell states 702A-702D and the date transformation action state 704A is associated with a database addition action state 704B that stores a value to the appropriate data column of one or more databases based on the mapping. For example, in some embodiments, the database addition action state 704B embodies or is otherwise associated with a process that stores a data value to a particular corresponding data property of the second data format (e.g., a data column of a particular table). In some such embodiments, the particular column to which the data value is stored is determined based on the prior state and/or associated information cell state from which the database addition action state 704B was traversed. In other contents, it should be appreciated that other action states may be embody and/or be associated with other database manipulation actions. For example, in some embodiments, one or more traversal paths of the states may be associated with a database update action state for updating a column of an existing data record in one or more tables of one or more databases. Additionally or alternatively, in some embodiments, one or more traversal paths of the states may be associated with a database deletion action state for deleting a data column of an existing data record (or deleting the entire data record) in one or more tables of one or more databases. Alternatively or additionally, in some embodiments, the database deletion action state updates an active status for a particular data record indicating whether the data record is active (e.g., and should be processed) or inactive (e.g., and should not be processed as if it were deleted). In some embodiments, a computing entity may be configured to depict a user interface that includes metadata about performed action states (e.g., a type of the performed action states, a timestamp of the performed action states, data units affected by the performed action states, and/or the like). In some embodiments, the action states may be manually inserted upon completion of the mapping for the remaining states to particular data properties of the custom data format for the output data of the second custom data format.

It should be appreciated that, as described herein, the trained modified finite state machine 700 may subsequently be utilized to perform data mapping of incoming data object(s) of the first custom data format to the second custom data format. In this regard, for data objects (e.g., individual data elements in of a sequential, semi-structured data set), the trained modified finite state machine 700 may be traversed to perform mapping of data values embodied in such data objects. Additionally or alternatively, multiple trained modified finite state machines may be generated to enable mapping of various custom data formats, for example associated with different incoming data objects of various different custom data formats received from different external data systems.

In some embodiments, the mappings of the trained modified state machine 700 are stored in a JSON format to provide a plurality of options to a user. For example, the user may list output columns to which a particular data point should map to together with the corresponding weights for such mappings. Alternatively or additionally, the user may list the transformations that should be performed for such data points.

It should be appreciated that the trained modified finite state machine may be embodied in any of a myriad of manners. In some embodiments, for example, the trained modified finite state machine is stored in a JSON format that embodies the states of the trained modified finite state machine, state transitions, and/or corresponding mapping weights. In one example context, each state includes possible sub-nodes (e.g., states having state transitions to another state), mapping weights associated with state transitions to another state, and/or the like. In some states, for example information cell states, the state includes data mapping to a particular portion of the output data (e.g., sub-node data representing the property, data column, and/or other portion of the output data in the custom data format to which data should be mapped). Additionally or alternatively, in some embodiments, each state includes additional data, such as a node name data and/or identifier data, data indicating whether child-data (e.g., subsequent states connected via state transition(s)) associated with the state is categorical, and/or the like. It should be appreciated that such data may be renderable, interpretable by a user, and/or modified manually by changing one or more data values represented in the JSON corresponding to the trained modified finite state machine.

Example Processes of the Disclosure

Having described example systems, apparatuses, computing environments, data visualizations, and processing component, example processes in accordance with the present disclosure will now be described. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart depicting operations of an example process for improved structured data format mapping in accordance with at least some example embodiments of the present disclosure. In some embodiments, the process 800 is embodied by computer program code stored on a non-transitory computer-readable medium of a computer program product configured for execution to perform the computer-implemented process described. Alternatively or additionally, in some embodiments, the process 800 is performed by one or more specially configured computing devices, such as the FSM-based mapping apparatus 200 alone or in communication with one or more external devices. In this regard, in some such embodiments, the FSM-based mapping apparatus 200 is specially configured by computer program instructions stored thereon, for example in the memory 204 and/or another component depicted and/or described herein, and/or otherwise accessible to the FSM-based mapping apparatus 200, for performing the operations depicted and described. In some embodiments, the specially configured FSM-based mapping apparatus 200 is in communication with one or more external apparatus(es), system(s), device(s), and/or the like, to perform one or more of the operations as depicted and described. For purposes of simplifying the description, the process 800 is described as performed by and from the perspective of the FSM-based mapping apparatus 200.

The process 800 begins at operation 802. At operation 802, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to identify sequential semi-structured input data associated with a first custom data format. In this regard, the first custom data format defines each row including a plurality of sequential data properties and/or associated data values, for example where the sequential data properties provide context for the subsequent data properties and/or data value(s) in the row and/or another row. The sequential semi-structured input data may embody validated input data that is associated with corresponding validated semi-structured output data accessible to the FSM-based mapping apparatus 200. In some embodiments, for example, the FSM-based mapping apparatus 200 receives the sequential semi-structured input data, such as from an external data system. In other embodiments, the FSM-based mapping apparatus retrieves the sequential semi-structured input data from one or more data repositories.

At operation 804, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to identify database structured output data corresponding to the sequential semi-structured input data. In some embodiments, the database structured output data is associated with a second custom data format. For example, the second custom data format may represent one or more table columns to which particular data properties of the first custom data format are to be mapped for purposes of performing additions, deletions, and/or updates to the corresponding table columns. The database structured output data may embody validated output data that is associated with the sequential semi-structured input data through one or more automatically generated and/or user-generated associations. In some embodiments, the FSM-based mapping apparatus 200 retrieves the database structured output data from one or more data repositories. In other embodiments, the FSM-based mapping apparatus 200 receives the database structured output data.

At operation 806, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to generate an untrained modified finite state machine associated with the first custom data format. In some such embodiments, the untrained modified finite state machine is generated utilizing a state extractor model. For example, in some embodiments, the FSM-based mapping apparatus 200 inputs the sequential semi-structured input data associated with the first custom data format to the state extractor model. The state extractor model may extract a set of extracted states together with corresponding state transitions that embody the untrained modified finite state machine associated with the first custom data format. For example, in some embodiments, the FSM-based mapping apparatus 200 utilizes a state extractor model embodying a statistical model that extracts the set of extracted states based on a statistical prevalence of data values for data properties in the sequential semi-structured input data of the first custom data format.

In some embodiments, the FSM-based mapping apparatus 200 parses one or more data values for various data properties of the sequential semi-structured input data of the first custom data format to extract particular data portions for processing. In this regard, the FSM-based mapping apparatus 200 may parse sequential semi-structured input data by separating tuples of the sequential semi-structured input data (e.g., each row of the sequential semi-structured input data) based on a first delimiter (e.g., a line break). Additionally or alternatively, in some embodiments, the FSM-based mapping apparatus may parse individual tuples of sequential semi-structured input data based on a second delimiter (e.g., an asterisk or another reserved character). In this regard, the individual data properties parsed for a particular tuple may be processed to determine whether the data property corresponds to a particular state (e.g., a root state, intermediary state, and/or information state), and/or informs the mapping of a subsequent data property. It should be appreciated that, in some embodiments, the FSM-based mapping apparatus 200 includes or is associated with a data parser that performs the parsing of sequential semi-structured input data and/or one or more portions thereof.

At operation 808, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to generate a trained modified finite state machine that maps the first custom data format to the second custom data format via one or more mapping-based actions. For example, the mapping-based actions may be embodied by one or more database addition action state(s), one or more database update action state(s), and/or one or more database deletion action state(s), or the like, of the trained modified finite state machine. The trained modified finite state machine may be generated based at least in part on the sequential semi-structured input data, the untrained modified finite state machine associated with the first custom data format, and the database structured output data. In this regard, for example, the trained modified finite state machine may be fill and/or otherwise update the "skeleton" set of extracted states embodying the untrained modified finite state machine based on known associations between the sequential semi-structured input data and the database structured output data as the untrained modified finite state machine is traversed. For example, in some embodiments, the trained modified finite state machine is generated based at least in part on traversing the set of extracted states to determine a statistical prevalence of various paths and data properties in the sequential semi-structured input data of the first custom data format, and generating mapping weights between extracted states based at least in part on such traversals, as described herein.

At operation 810, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to enable access to the modified finite state machine in order to perform the one or more mapping-based actions. In some embodiments, to enable such access, the trained modified finite state machine is stored to a mapping repository for subsequent use. For example, in some embodiments, the trained modified finite state machine is associated with an identifier uniquely identifying the first custom data format such that the trained modified finite state machine may be retrieved for use in subsequent instances where new sequential semi-structured input data of the first custom data format is received for processing. Alternatively or additionally, in some embodiments, the trained modified finite state machine is associated with one or more other identifiers that identify contexts in which the trained modified finite state machine is to be utilized for processing subsequently received sequential semi-structured input data. For example, in some embodiments, the trained modified finite state machine is associated with a system identifier corresponding to a particular external data system that utilizes the first custom data format. In this regard, the trained modified finite state machine may be retrieved at a later instance in circumstances where subsequent sequential semi-structured input data of the first custom data format is received from the identified external data system for processing.

In some embodiments, at an optional operation 812, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to apply a second set of sequential semi-structured input data associated with the first custom data format to the trained modified finite state machine to generate a second set of database structured output data associated with the second custom data format. In this regard, the second set of sequential semi-structured input data may be received at a later time from one or more external data systems that utilize and/or otherwise store data in the first custom data format. In some embodiments, the trained modified finite state machine is retrieved from a mapping repository for use with the second set of sequential semi-structured input data. For example, the trained modified finite state machine may be retrieved based on a system identifier for the external data system from which the second set of sequential semi-structured input data is received, and/or based on a determination that the second set of sequential semi-structured input data is associated with the first custom data format. In this regard, the "right" trained modified finite state machine for processing a sequential, semi-structured input of a particular custom data format may be retrieved for use.

FIG. 9A illustrates a flowchart depicting operations of another example process for improved structured data format mapping in accordance with at least some example embodiments of the present disclosure. Specifically, FIG. 9A depicts an example process 900 for configuring an untrained modified finite state machine. In some embodiments, the process 900 is embodied by computer program code stored on a non-transitory computer-readable medium of a computer program product configured for execution to perform the computer-implemented process described. Alternatively or additionally, in some embodiments, the process 900 is performed by one or more specially configured computing devices, such as the FSM-based mapping apparatus 200 alone or in communication with one or more external devices. In this regard, in some such embodiments, the FSM-based mapping apparatus 200 is specially configured by computer program instructions stored thereon, for example in the memory 204 and/or another component depicted and/or described herein, and/or otherwise accessible to the FSM-based mapping apparatus 200, for performing the operations depicted and described. In some embodiments, the specially configured FSM-based mapping apparatus 200 is in communication with one or more external apparatus(es), system(s), device(s), and/or the like, to perform one or more of the operations including the various operations depicted and described herein. For purposes of simplifying the description, the process 900 is described as performed by and from the perspective of the FSM-based mapping apparatus 200.

The process 900 begins at optional operation 900. In some embodiments, the process 900 begins after one or more operations of another process, such as the operation 806 of the process 800 as depicted and described. Additionally or alternatively, in some embodiments, upon completion of the process 900 flow proceeds to one or more operations of another process, such as the operation 808 of the process 800 as depicted and described. In other embodiments, the flow ends upon completion of the process 900.

At operation 902, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to configure, via user input, the untrained modified finite state machine associated with the first custom data format. In some such embodiments, the untrained modified finite state machine is embodied in a human-readable and editable data format to enable such configuring. For example, the user may configure (i.e., modify to train) the untrained modified finite state machine associated with the first custom data format by altering or deleting at least one state of the untrained modified finite state machine. In one example context, the user may view the set of extracted states embodying the untrained modified finite state machine and delete one or more of such extracted states determined to not accurately represent a state. For example, in circumstances where a limited set of data values may be provided, such data values may be improperly learned as states due to their statistical prevalence, and the user may provide user input to delete such states from the set of extracted states embodying the untrained modified finite state machine.

In some embodiments, the FSM-based mapping apparatus 200 provides and/or otherwise causes rendering of one or more user interfaces for configuring the untrained modified finite state machine. In some embodiments, for example, the FSM-based mapping apparatus 200 causes rendering of at least one user interface that includes the set of extracted states (or at least a portion thereof) in a human-readable and editable format for viewing by the user. In this regard, the user may interact with particular interface elements corresponding to particular states of the set of extracted states to alter and/or delete such states. It should be appreciated that, in at least some contexts, a deleted state additionally deletes subsequent states that are only associated with a path with the deleted state in a downstream manner (such that the deleted state is upstream to the noted subsequent states).

FIG. 9B illustrates a flowchart depicting operations of another example process for improved structured data format mapping in accordance with at least some example embodiments of the present disclosure. Specifically, FIG. 9B depicts an example process 950 for configuring a trained modified finite state machine. In some embodiments, the process 950 is embodied by computer program code stored on a non-transitory computer-readable medium of a computer program product configured for execution to perform the computer-implemented process described. Alternatively or additionally, in some embodiments, the process 950 is performed by one or more specially configured computing devices, such as the FSM-based mapping apparatus 200 alone or in communication with one or more external devices. In this regard, in some such embodiments, the FSM-based mapping apparatus 200 is specially configured by computer program instructions stored thereon, for example in the memory 204 and/or another component depicted and/or described herein, and/or otherwise accessible to the FSM-based mapping apparatus 200, for performing the operations depicted and described. In some embodiments, the specially configured FSM-based mapping apparatus 200 is in communication with one or more external apparatus(es), system(s), device(s), and/or the like, to perform one or more of the operations as depicted and described. For purposes of simplifying the description, the process 950 is described as performed by and from the perspective of the FSM-based mapping apparatus 200.

The process 950 begins at operation 952. In some embodiments, the process 950 begins after one or more operations of another process, such as the operation 808 of the process 800 as depicted and described. Additionally or alternatively, in some embodiments, upon completion of the process 950 flow proceeds to one or more operations of another process, such as the operation 810 of the process 800 as depicted and described. In other embodiments, the flow ends upon completion of the process 950.

At operation 952, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to configure, via user input, the trained modified finite state machine associated with the first custom data format. In some such embodiments, the trained modified finite state machine is embodied in a human-readable and editable data format to enable such configuring. For example, the user may configure the trained modified finite state machine associated with the first custom data format by altering or deleting at least one state of the trained modified finite state machine. In one example context, the user may view a state associated with a plurality of possible subsequent states (e.g., information cell states or other intermediary states) each having a mapping weight above a particular mapping weight threshold. For example, in circumstances where a particular data value embodied may be determined as likely to be mapped to either of two information cell states (e.g., a first information cell state associated with a first data column of a table and a second information cell state associated with a second column of a table or a different table), the resulting mapping weights for the transitions between a previous state (e.g., an intermediary state) and the two information cell states may each satisfy a mapping weight threshold, and the user may provide user input that assigns one of the information cell states determined by the user to represent the correct mapping and/or that deletes or reassigns the other state from the set of states embodying the other information cell state. In this regard, the FSM-based mapping apparatus 200 may provide choices for recommended states and/or state transitions of a trained modified finite state machine together with their weights such that the user may make a streamlined, manual decision on statistically close choices without performing many other mappings manually.

In some embodiments, the FSM-based mapping apparatus 200 provides and/or otherwise causes rendering of one or more user interfaces for configuring the trained modified finite state machine. In some embodiments, for example, the FSM-based mapping apparatus 200 causes rendering of at least one user interface that includes the set of states (or at least a portion thereof) embodying the trained modified finite state machine in a human-readable and editable format for viewing by the user. In this regard, the user may interact with particular interface elements corresponding to particular states of the set of states to alter and/or delete such states. It should be appreciated that, in at least some contexts, a deleted state additionally deletes subsequent states that are only associated with a path with the deleted state in a downstream manner (such that the deleted state is upstream to the noted subsequent states).

Alternatively or additionally, in some embodiments, the FSM-based mapping apparatus 200 provides and/or otherwise causes rendering of one or more user interfaces for displaying states having multiple state transitions with mapping weights above a mapping weight threshold. For example, in this regard, such user interfaces may include the source state and the possible destination states each in a human-readable and editable format. Additionally or alternatively, in some embodiments, such user interfaces may include the mapping weights of each state transition, and/or other information regarding any of the described states. In this regard, the user may interact with particular interface elements to select a state to assign as the next state for a particular data property, and/or may delete or alter the other unselected state (e.g., to delete it entirely or associate it with another data value, for example).

Example Detailed Implementations of the Disclosure

FIG. 10 illustrates a flowchart depicting operations of a particular example process for improved structured data format mapping in accordance with at least some example embodiments of the present disclosure. In some embodiments, the process 1000 is embodied by computer program code stored on a non-transitory computer-readable medium of a computer program product configured for execution to perform the computer-implemented process described. Alternatively or additionally, in some embodiments, the process 1000 is performed by one or more specially configured computing devices, such as the FSM-based mapping apparatus 200 alone or in communication with one or more external devices. In this regard, in some such embodiments, the FSM-based mapping apparatus 200 is specially configured by computer program instructions stored thereon, for example in the memory 204 and/or another component depicted and/or described herein, and/or otherwise accessible to the FSM-based mapping apparatus 200, for performing the operations depicted and described. In some embodiments, the specially configured FSM-based mapping apparatus 200 is in communication with one or more external apparatus(es), system(s), device(s), and/or the like, to perform one or more of the operations including the various operations depicted and described herein. For purposes of simplifying the description, the process 1000 is described as performed by and from the perspective of the FSM-based mapping apparatus 200.

The process 1000 begins at operation 1002. At operation 1002, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to receive an input buffer stream. The input buffer stream may be received from a particular external data system (e.g., a system associated with an employer or otherwise a trading partner) embodying a source for sequential semi-structured input data of a first custom data format. The input buffer stream may be received for processing at various time intervals, for example weekly, daily, or in real-time. The input buffer stream may include any number of files for processing.

At operation 1004, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to determine whether the files embodied by the input buffer stream is/are in a particular format, for example an X12 format. The FSM-based mapping apparatus 200 may be configured to process one or more of the files utilizing a particular algorithm configured to determine whether the input files are in X12 format. It should be appreciated that any of a number of X12 format checking algorithms may be utilized to make such a determination. In circumstances where the received file(s) is/are in X12 format, flow proceeds to operation 1008. In circumstances where the received file(s) is/are not in X12 format, flow proceeds to operation 1006.

At operation 1006, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to store indexed output tuples to match with X12 input data. In this regard, the X12 version of the input data may represent the second custom data format targeted for data conversion. The indexed output tuples may be manually generated by a user of the FSM-based mapping apparatus 200. Alternatively or additionally, in some embodiments, the FSM-based mapping apparatus 200 receives the indexed output tuples from a separate device and/or system that stores and/or creates such indexed output tuples. In this regard, each tuple of the indexed output tuples maps to a particular portion of the input data, such that the links between data values of the input data files and corresponding output tuples.

At operation 1008, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to collect a number of samples from the same source. For example, the FSM-based mapping apparatus 200 may receive samples files from the source at different time intervals, and/or receive a plurality of sample files in a batch input stream. At operation 1010, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to store the samples for creating mapping rules. In this regard, the FSM-based mapping apparatus 200 may store each sample file as it is received. For example, in some embodiments, the FSM-based mapping apparatus 200 maintains a sample repository that includes the received files together with an indication of the source from which the samples were received.

At operation 1012, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to perform statistical analysis for segment ID and required elements. In this regard, the statistical analysis may represent which data properties and corresponding data values are statistically most prevalent in various segments of the data formats, which are required, and/or the like. In this regard, the statistical analysis may identify the various portions of the custom data format.

At operation 1014, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to collect information for each segment. For example, such information may include primitive values in the segment, various data properties present in the segment, and/or the like. Such information may be stored as a result of the statistical analysis of a particular segment. At operation 1016, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to store such segment information. For example, the segment information may be stored for further processing, such as to create a traversal mimic mapping from such segment information.

At operation 1018, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to create traversal mimic mapping. The traversal mimic mapping may represent a states of a finite state machine, for example including a plurality of extracted states determined from the processed segment information. The traversal mimic mapping may form a skeleton finite state machine linking segments of the input data to output mappings to be filled in subsequent operations.

At operation 1020, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to create traversal mapping rules by matching primitive value and output cell. The traversal mapping rules may be embodied by a modified finite state machine that maps to a particular output custom data format (e.g., X12) and was created from samples of a first custom data format associated with the stored samples. In some embodiments, the primitive values are identified from the various samples from a particular source. In this regard, the FSM-based mapping apparatus 200 may utilize the traversal mimic mapping to map the primitives identified from the various sample files to the output data identified by the indexed output tuples in the second custom data format (e.g., X12).

At operation 1022, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to enable cross verification from a user of the traversal mapping rules. For example, the traversal mapping rules may be stored in a human-readable and/or human-editable format, such as JSON. In this regard, a user may view the traversal mapping rules, and edit one or more of such traversal mapping rules, add to the traversal mapping rules, delete a traversal mapping rule, and/or otherwise modify the traversal mapping rules upon determination that such modifications are appropriate.

At operation 1024, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to report accuracy of traversal mapping rules. For example, the FSM-based mapping apparatus 200 may process one or more test input data files with known index output tuples, and determine an error differential between the actual known outputs and those produced by the traversal mapping rules. In this regard, the greater the number of incorrect mappings performed by the traversal mapping rules for such known input data, the lower the accuracy of the traversal mapping rules.

At operation 1026, the FSM-based mapping apparatus 200 includes means, such as the mapping execution circuitry 212, the mapping training circuitry 210, the mapping modification circuitry 214, the communications circuitry 208, the input/output circuitry 206, and/or the processor 202, to store the traversal mapping rules for future use in a human-readable format. In some embodiments, the traversal mapping rules are stored in a mapping repository associated with particular information that associates it with input data of a particular custom data format. For example, in some embodiments, the traversal mapping rules are stored together with information that identifies the source for which the traversal mapping rules should be used, the custom data format, and/or the like.

FIG. 11A illustrates a block diagram of an example computing architecture for improved structured data format mapping of X12-based files in accordance with at least some example embodiments of the present disclosure. Specifically, the example computing architecture depicted enables utilizing of stored traversal mapping rules to process new incoming data objects. The computing architecture may enable such processing after one or more iterations of the processes for creating traversal mapping rules, such as the processes 800 and/or 1000, for any number of different sources of such input data.

X12-based files, for example, may be processed by a plurality of data components that perform the various functionality described herein. Specifically, as illustrated, newly received X12-based files are processed by an employer identifier (e.g., a component that identifies an employer or other trading partner identifier associated with the source of the input data) that distinguishes between new employers and old/previously identified employers. In circumstances where a new employer is identified, the X12-based input data may be utilized to create a preliminary traversal mimic mapping outline via a traversal mimic mapping outliner. Using stored traversal mapping rules, partial matching with the traversal mimic mapping module may be performed to help identify the closest traversal mapping rules. Based on the new primitive value set, a best match and custom functions may be identified and/or created associated with the new employer. For example, a DQC module utilizes data from the parent database to perform one or more active learning operations, such as to determine the feature based similarity model and/or deep learning model as depicted. The best match and custom functions (e.g., determined from the DQC module) may be utilized to create best traversal mapping rules for the new employer, and store the new traversal mapping rules to a traversal mapping rules module storage.

In circumstances where the employer is identified as an old employer, the employer mapping fetcher may fetch mappings (e.g., traversal mapping rules) associated with the employer. In this regard, the traversal mapping rules may be identified from a traversal mapping rules module storage, for example in a human-readable and/or human-editable format (e.g., JSON). In some embodiments, a user creates and/or add custom functions to modify the traversal mapping rules, for example via a traversal mapping rules application module. Alternatively or additionally, in circumstances where the traversal mapping rules are finished being modified and/or not modified, the traversal mapping rules application module may create a traversal mapping rules object, fetch custom methods, and/or create queries and/or other data objects corresponding to the input data. In this regard, the resulting output data object(s) may be stored to the parent database, for example for storage and/or further processing.

FIG. 11B illustrates a block diagram of another example computing architecture for improved structured data format mapping of multiple data format types in accordance with at least some example embodiments of the present disclosure. Specifically, the example computing architecture depicted utilizes stored traversal mapping rules to process new incoming data objects of various data format types, namely X-12 based files and flat files. The computing architecture may enable such processing after one or more iterations of the processes for creating traversal mapping rules, such as the processes 800 and/or 1000, for any number of different sources of such input data.

It should be appreciated that the X12-based files may be processed as described herein with respect to FIG. 11A. For purposes of brevity and to simplify the description, repeated disclosure of such functionality is omitted.

As new data is received, it may be processed dependent on the type of file embodied by the input data. In some such embodiments, a data segregator is configured to distinguish flat files from X12-based formatted files. Flat files are processed utilizing a first set of operational components 1104, and X12-based files are processed utilizing a second set of operational components 1102. In this regard, multiple sources are of file types are received as incoming data to the DQC component to learn column similarities and mappings. In this regard, the learnings of the DQC model for any of a number of formats (e.g., flat files) may inform aspects of processing another file type (e.g., improvements in the value set identification) as described herein. It should be appreciated that in some embodiments, flat files are mapped and/or otherwise processed utilizing any of a myriad of processes known in the art.

Flat files may be processed by a version identifier to determine if the received input data is in an existing version or a new version. In a circumstance where the input data is in an existing version, an employer mapping fetcher identifies mapping rules from the flat file mapping storage. The mapping rules may be utilized to process the input tuples via a DQC mapping module that creates queries or other data objects from the input tuples. The resulting output data object(s) (e.g., in a target custom data format) may be stored in the parent database for future use and/or processing.

In circumstances where the input data embodies a new version of the flat file for the employer, a new version profile is created. The new version profile may be created for association with newly created traversal mapping rules, for example to be created at a subsequent operation. For the newly created version profile and based on the input data, a new primitive value set may be identified. In some embodiments, the primitive value set is identified utilizing at least a portion of user intervention, for example to extract one or more of such primitive values from the new version of the input data. Utilizing the identified primitive value set, a best match and custom functions may be identified and/or created associated with the new version. Such operations may be performed by a DQC module utilizing the feature-based similarity model, deep learning model, and/or top matching results. In some embodiments, a user (e.g., a subject matter expert) intervenes to make the best match and/or add custom functions associated with the new version. The resulting information is utilized to create a flat file mapping for the new version, which is stored to the flat file mapping storage for subsequent use (e.g., to convert subsequent input data from the employer from the custom data format represented by the new format).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by one or more processors, sequential semi-structured input data associated with a first custom data format;
identifying, by the one or more processors, database structured output data associated with the sequential semi-structured input data, wherein the database structured output data is associated with a second custom data format;
generating, by the one or more processors and using a state extractor model, an untrained modified finite state machine associated with the first custom data format, the untrained modified finite state machine comprising a set of extracted states; and
generating, by the one or more processors, a trained modified finite state machine configured to map the first custom data format to the second custom data format via one or more mapping-based actions based at least in part on (i) the sequential semi-structured input data, (ii) the untrained modified finite state machine associated with the first custom data format, and (iii) the database structured output data; and
enabling, by the one or more processors, access to the trained modified finite state machine to perform the one or more mapping-based actions.

2. The computer-implemented method according to claim 1, further comprising:
altering or deleting a state of the untrained modified finite state machine associated with the first custom data format based at least in part on user input.

3. The computer-implemented method according to claim 1, further comprising:
altering or deleting a state of the trained modified finite state machine based at least in part on user input.

4. The computer-implemented method according to claim 1, further comprising:
generating a second set of database structured output data by applying second sequential semi-structured input data associated with the first custom data format to the trained modified finite state machine, wherein the second database structured output is data associated with the second custom data format.

5. The computer-implemented method according to claim 1, wherein (i) the trained modified finite state machine comprises a set of states and a set of state transitions, (ii) a state of the set of states is associated with (a) a first state transition to a first sub-state and (b) a second state transition to a second sub-state, (iii) the first state transition is associated with a first mapping weight, (iv) the second state transition is associated with a second mapping weight, and (v) the computer-implemented method further comprises:
determining, based at least in part on the first mapping weight and the second mapping weight, whether to utilize the first sub-state or the second sub-state.

6. The computer-implemented method according to claim 1, wherein the state extractor model is configured for:
identifying, based at least in part on the first custom data format, a set of root states and a set of intermediary states.

7. The computer-implemented method according to claim 1, wherein the trained modified finite state machine comprises (i) a database addition action state, (ii) a database deletion action state, and (iii) a database update action state, and wherein mapping the first custom data format to the one or more mapping-based actions is performed based at least in part on (i) the database addition action state, (ii) the database deletion action state, and (iii) the database update action state.

8. The computer-implemented method according to claim 1, wherein the first custom data format is associated with a first external data system that originated the sequential semi-structured input data.

9. The computer-implemented method according to claim 1, wherein each extracted state of the untrained modified finite state machine is in a human-readable and editable data format.

10. The computer-implemented method according to claim 1, wherein each state of the trained modified finite state machine is in a human-readable and editable data format.

11. The computer-implemented method according to claim 1, wherein the trained modified finite state machine is associated with:
(i) a finite non-empty set of symbols embodying an input alphabet;
(ii) a finite non-empty set of states;
(iii) an initial state from the finite non-empty set of states;
(iv) a non-empty set of actions that can be taken after every state transition;
(v) a set of mapping weights assigned to various actions from the non-empty set of actions for a corresponding state from the finite non-empty set of states, wherein the mapping weight for a corresponding action from the non-empty set of actions is calculated based at least in part on a frequency of transition path occurrence from the corresponding state to the corresponding action;
(vi) a state-transition transformation from a domain space characterized by (a) the finite non-empty set of states, (b) the finite non-empty set of symbols, and (c) a co-domain space characterized by the non-empty set of actions; and
(vii) a set of final states that is a subset of the finite non-empty set of states.

12. An apparatus comprising one or more processors and at least one non-transitory memory, the at least one non-transitory memory having computer-coded instructions stored thereon, wherein the at least one non-transitory memory in execution with the one or more processors configures the apparatus to:

receive sequential semi-structured input data associated with a first custom data format;

identify database structured output data associated with the sequential semi-structured input data, wherein the database structured output data is associated with a second custom data format;

generate, using a state extractor model, an untrained modified finite state machine associated with the first custom data format, the untrained modified finite state machine comprising a set of extracted states; and generate a trained modified finite state machine configured to map the first custom data format to the second custom data format via one or more mapping-based actions based at least in part on (i) the sequential semi-structured input data, (ii) the untrained modified finite state machine associated with the first custom data format, and (iii) the database structured output data; and enable access to the trained modified finite state machine to perform the one or more mapping-based actions.

13. The apparatus according to claim 12, further configured to:

alter or delete a state of the untrained modified finite state machine based at least in part on user input.

14. The apparatus according to claim 12, further configured to:

alter or delete a state of the trained modified finite state machine based at least in part on user input.

15. The apparatus according to claim 12, further configured to:

generate second database structured output data by applying second sequential semi-structured input data associated with the first custom data format to the trained modified finite state machine, wherein the second database structured output data is associated with the second custom data format.

16. The apparatus according to claim 12, wherein (i) the trained modified finite state machine comprises a set of states and a set of state transitions, (ii) a state of the set of states is associated with (a) a first state transition to a first sub-state and (b) a second state transition to a second sub-state, (iii) the first state transition is associated with a first mapping weight, (iv) the second state transition is associated with a second mapping weight, and (v) the apparatus is further configured to:

determine, based at least in part on the first mapping weight and the second mapping weight, whether to utilize the first sub-state or the second sub-state.

17. The apparatus according to claim 12, wherein the state extractor model is configured to:

identify, based at least in part on the first custom data format, a set of root states and a set of intermediary states.

18. The apparatus according to claim 12, wherein the trained modified finite state machine comprises (i) a database addition action state, (ii) a database deletion action state, and (iii) a database update action state, and wherein mapping the first custom data format to the one or more mapping-based actions is performed based at least in part on (i) the database addition action state, (ii) the database deletion action state, and (iii) the database update action state.

19. A computer program product comprising at least one non-transitory computer-readable storage medium having computer program code stored thereon, the computer program code, in execution with one or more processors, configured for:

receiving sequential semi-structured input data associated with a first custom data format;

identifying database structured output data associated with the sequential semi-structured input data, wherein the database structured output data is associated with a second custom data format;

generating, using a state extractor model, an untrained modified finite state machine associated with the first custom data format, the untrained modified finite state machine comprising a set of extracted states; and generating a trained modified finite state machine configured to map the first custom data format to the second custom data format via one or more mapping-based actions based at least in part on (i) the sequential semi-structured input data, (ii) the untrained modified finite state machine associated with the first custom data format, and (iii) the database structured output data; and enabling access to the trained modified finite state machine to perform the one or more mapping-based actions.

20. The computer program product according to claim 19, further configured for:

altering or deleting a state of the untrained modified finite state machine based at least in part on user input.

\* \* \* \* \*